(12) United States Patent
Hazel

(10) Patent No.: US 10,839,600 B2
(45) Date of Patent: Nov. 17, 2020

(54) GRAPHICS PROCESSING SYSTEMS

(71) Applicant: Arm Limited, Cambridge (GB)

(72) Inventor: Graham Paul Hazel, Cambridge (GB)

(73) Assignee: Arm Limited, Cambridge (GB)

(*) Notice: Subject to any disclaimer, the term of this patent is extended or adjusted under 35 U.S.C. 154(b) by 0 days.

(21) Appl. No.: 16/074,941

(22) PCT Filed: Feb. 10, 2017

(86) PCT No.: PCT/GB2017/050365
§ 371 (c)(1),
(2) Date: Aug. 2, 2018

(87) PCT Pub. No.: WO2017/137772
PCT Pub. Date: Aug. 17, 2017

(65) Prior Publication Data
US 2019/0035147 A1  Jan. 31, 2019

(30) Foreign Application Priority Data

Feb. 12, 2016 (GB) .................... 1602545.4

(51) Int. Cl.
*G06T 15/00* (2011.01)
*G06T 15/08* (2011.01)
(Continued)

(52) U.S. Cl.
CPC ............ *G06T 17/10* (2013.01); *G06T 1/20* (2013.01); *G06T 7/11* (2017.01); *G06T 15/005* (2013.01);
(Continued)

(58) Field of Classification Search
CPC ....... G06T 15/005; G06T 15/08; G06T 15/60; G06T 17/005; G06T 17/10; G06T 1/20; G06T 2210/12; G06T 7/11
See application file for complete search history.

(56) References Cited

U.S. PATENT DOCUMENTS 5,517,611 A * 5/1996 Deering .................... G06F 9/30
345/503
6,747,651 B1   6/2004 Tan
(Continued)

FOREIGN PATENT DOCUMENTS

| | | |
|---|---|---|
| GB | 2524287 | 9/2015 |
| GB | 2525636 | 11/2015 |
| WO | 2016/012756 | 1/2016 |

OTHER PUBLICATIONS

PCT International Search Report dated Apr. 26, 2017, PCT Patent Application PCT/GB2017/050365.
(Continued)

*Primary Examiner* — Sing-Wai Wu
(74) *Attorney, Agent, or Firm* — Vierra Magen Marcus LLP

(57) ABSTRACT

A set of plural primitives to be processed (140) for a frame for output in a graphics processing system is divided into plural subsets of primitives (141), such that each primitive is allocated into one subset of primitives only, and each subset of primitives contains only contiguous primitives. For each subset of primitives that the set of primitives has been divided into, data representative of the primitives of the subset of primitives, and data indicating the volume of space that the subset of primitives falls within, is generated and stored (143). This data is stored as a tree representation of the set of primitives with each leaf node of the tree representing a respective sub-set of primitives that the set of primitives has been divided into (142). The tree representation of the subsets of primitives is then used, e.g., to determine respective sets of subsets of primitives that could cast a shadow from a light source for respective regions of an output frame to be generated.

19 Claims, 16 Drawing Sheets

(51) Int. Cl.
  *G06T 15/60*  (2006.01)
  *G06T 17/00*  (2006.01)
  *G06T 17/10*  (2006.01)
  *G06T 1/20*  (2006.01)
  *G06T 7/11*  (2017.01)
(52) U.S. Cl.
  CPC .............. *G06T 15/08* (2013.01); *G06T 15/60* (2013.01); *G06T 17/005* (2013.01); *G06T 2210/12* (2013.01)

(56) References Cited

U.S. PATENT DOCUMENTS

| | | | | |
|---|---|---|---|---|
| 2009/0195555 | A1* | 8/2009 | Nystad | G09G 5/363 345/620 |
| 2013/0016109 | A1 | 1/2013 | Garanzha | |
| 2015/0269770 | A1 | 9/2015 | Jenkins | |
| 2015/0317825 | A1* | 11/2015 | Hazel | G06T 15/60 345/426 |
| 2016/0363291 | A1* | 12/2016 | Sun | G02B 19/0023 |
| 2017/0186128 | A1* | 6/2017 | Akenine-Moller | G06T 1/20 |

OTHER PUBLICATIONS

Combined Search and Examination Report, dated Aug. 1, 2016, GB Patent Application GB1602545.4.
PCT international Preliminary Report on Patentability, dated Aug. 14, 2018, PCT Patent Application PCT/GB2017/050365.

\* cited by examiner

GRAPHICS PROCESSING SYSTEMS

BACKGROUND

The technology described herein relates to graphics processing systems and in particular to methods of and apparatus for identifying primitives to be considered when taking account of the effect of shadows when rendering images for output (e.g. for display).

The Applicants have previously proposed in their GB Patent Application GB-A-2525636 a technique for taking account of the effect of shadows when rendering images for output. In this technique, for each region of a frame being rendered, a set of geometry that could cast a shadow is determined, and then for each sampling position of a set of sampling positions for the region of the frame being rendered, a light source visibility parameter is determined using the determined set of geometry. The so-determined light source visibility parameters are then used, e.g., to modulate a light source when shading the geometry in the frame region to produce the effect of shadows in the frame region.

One embodiment of this operation is the determination of the set of geometry for a frame region that could cast a shadow and then the use of that determined set of geometry for, in effect, determining what shadows are being cast in the frame region. The geometry to be processed for the output frame in this regard will typically be defined in terms of (as a set of) so-called primitives, which are usually simple polygons such as triangles.

While it would be possible simply to consider each primitive that is defined for the frame in question in turn to determine the set of geometry that could cast a shadow for a frame region, and correspondingly then test each primitive in the determined set of geometry when determining the light source visibility parameters for a frame region, the Applicants have recognised that it would be desirable to be able to perform these processes in a more efficient manner and to try to provide more efficient techniques for performing these processes.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
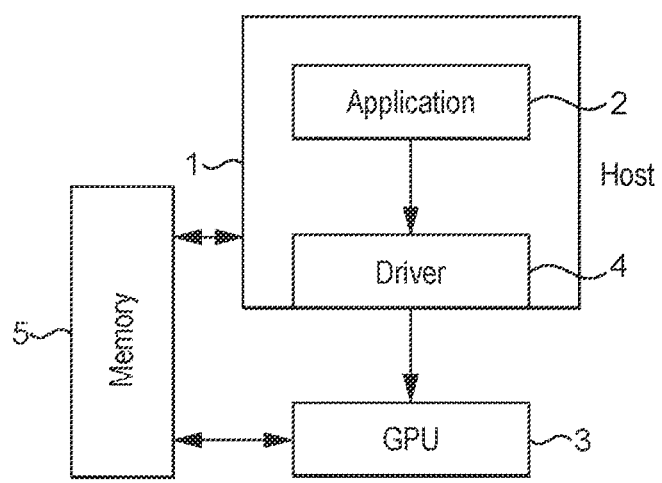
FIG. 1 shows an exemplary computer graphics processing system.

A first embodiment of the technology described herein comprises a method of processing a set of plural primitives to be processed for a frame for output in a graphics processing system, each primitive in the set of primitives being associated with one or more vertices, the method comprising:

dividing the set of primitives into plural subsets of primitives, such that each primitive is allocated into one subset of primitives only, and each subset of primitives contains only contiguous primitives; and generating and storing for each subset of primitives that the set of primitives has been divided into, data representative of the primitives of the subset of primitives, and data indicating the volume of space that the subset of primitives falls within.

A second embodiment of the technology described herein comprises an apparatus for processing a set of plural primitives to be processed for a frame for output in a graphics processing system, each primitive in the set of primitives being associated with one or more vertices, the apparatus comprising processing circuitry configured to:

divide a set of primitives to be processed for a frame for output in a graphics processing system into plural subsets of primitives, such that each primitive is allocated into one subset of primitives only, and each subset of primitives contains only contiguous primitives; and generate and store for each subset of primitives that the set of primitives has been divided into, data representative of the primitives of the subset of primitives, and data indicating the volume of space that the subset of primitives falls within.

In the technology described herein, a set of primitives to be processed when generating an output frame in a graphics processing system is subdivided into plural subsets of primitives, and for each subset of primitives data representative of the primitives of the subset of primitives and data indicating the volume of space that the subset of primitives falls within (occupies) is stored. Moreover, each subset of primitives contains only contiguous primitives and each primitive is present in one subset of primitives only.

As will be discussed further below, subdividing a set of primitives to be processed into subsets in this manner, and then storing such data for each subset of primitives facilitates, inter alia, more effectively identifying primitives (i.e. geometry) that could cast a shadow in a region of a frame being rendered, e.g., and in an embodiment, for use in the techniques of the Applicant's earlier patent application GB-A-2525636 for taking account of the effect of shadows when rendering images for display.

Moreover, and again as will be discussed further below, the process of subdividing the set of primitives into subsets in the manner of the technology described herein, and the generating and storing of such data for the subsets of primitives, can be performed in an efficient manner, and relatively quickly, thereby making it, e.g., suitable for use when performing "real time" graphics processing (and further facilitating performing the shadowing techniques of the Applicant's earlier patent application in real time).

For example, the requirement that each subset of graphics primitives only contains contiguous primitives, means that, as will be discussed further below, the data that needs to be stored to represent the primitives of the subset of primitives can be reduced and/or stored in a more efficient manner. Equally, the subsequent testing of the subset of primitives to determine whether it could cast a shadow from a light source can equally be performed in a more efficient manner. This then has the effect of being able to provide, e.g., significant savings in bandwidth, processing requirements, power etc., when performing the shadowing technique of the Applicant's earlier patent application, and is, accordingly, particularly advantageous in the context of graphics processing systems for use in lower powered and/or portable devices.

The frame for output that is to be generated in the technology described herein can be any suitable and desired output frame that is to be generated by the graphics processing system. In one embodiment, it is an output frame for display (on a screen or via a printer, for example), but it could equally be any other form of output that a graphics processing system can be used to produce, such as a texture (e.g. in a render-to-texture process), or any other form of output data array.

The set of primitives may be any suitable set of primitives that is to be processed to generate the output frame. It may comprise any desired and suitable number of primitives.

The set of primitives may comprise all of the primitives that are to be processed to generate the output frame, but in an embodiment comprises some but not all of the primitives to be processed to generate the output frame. In this latter case, the set of primitives in an embodiment comprises a particular, identifiable set of primitives for the frame. In an embodiment, the set of primitives comprises a set of primitives that share a common transformation (e.g. translation and rotation—i.e. they are to be transformed by the same world matrix). In an embodiment, the set of primitives comprises all the static geometry for a frame. Such sets of primitives may comprise a single draw call, but this isn't necessary and they could comprise plural draw calls (e.g. with the same world matrix and/or that all contain static geometry) if desired.

Where the set of primitives does not comprise all the primitives for the output frame (i.e. there are plural sets of primitives (e.g. draw calls) to be processed for the output frame), then the process of the technology described herein is in an embodiment performed for plural of (and in an embodiment for each of) the sets of primitives (e.g. draw calls) for the output frame (and in an embodiment repeated for each set of primitives (e.g. draw call) of the output frame).

Correspondingly, the operation in the manner of the technology described herein is in an embodiment repeated for plural output frames to be generated, such as for a sequence of frames to be displayed.

Where plural sets of primitives are being processed in the manner of the technology described herein, then in an embodiment, data generated for one set of primitives can be, and is in an embodiment, retained (e.g., and in an embodiment, cached) for use with another (e.g. subsequent) set of primitives (where it is appropriate and (potentially) useful to do that).

The set of primitives is divided into subsets of contiguous primitives. In an embodiment, a primitive is considered to be contiguous with another primitive, if the primitives share an edge (if it shares an edge with that other primitive).

Thus, in an embodiment, the set of primitives is divided into plural subsets of primitives, such that each primitive is allocated into one subset of primitives only, and each subset of primitives contains only primitives that share a common edge with at least one other primitive in the subset of primitives. (It should be noted in this regard that all the primitives in a subset of primitives do not have to share the same common edge, rather the requirement is that each primitive in the subsets of primitives shares a common edge with another primitive in the subset of primitives (i.e. that there is no primitive in the subset of primitives that does not share a common edge with another primitive in the subset of primitives).)

Thus the set of primitives is in an embodiment divided into plural subsets of primitives such that no subset of primitives (that contains more than one primitive) contains a primitive that does not share a common edge with at least one other primitive in the subset of primitives.

The primitives can be grouped into subsets each containing only contiguous primitives in any suitable and desired manner.

In an embodiment, a subset of primitives is created by taking a primitive of the set of primitives that has not yet been allocated to a subset of primitives, determining if that primitive has any adjacent primitives that it is contiguous with that have not yet been allocated to a subset of primitives, and, if so, adding that contiguous primitive (or one of the contiguous primitives) to the subset of primitives that the current primitive is part of. It is in an embodiment then determined if there is an unallocated primitive that is contiguous with a primitive of the subset of primitives, and if so, that contiguous primitive is added to the subset of primitives, and so on, until the subset in question is to be considered to be complete or finished, or the set of primitives is exhausted (finished).

Thus in an embodiment, the set of primitives is divided into plural subsets of primitives by (and each subset of primitives is formed by):

taking an unallocated primitive of the set of primitives as a starting primitive for a subset of primitives;

determining if that starting primitive for the subset of primitives has any contiguous, adjacent primitives that are not yet allocated to a subset of primitives; and when it is determined that the starting primitive has an adjacent, contiguous, primitive that is not already allocated to a subset of primitives, adding that primitive to the subset of primitives; and determining if there is another primitive that is not yet allocated to a subset of primitives that is adjacent to and contiguous with at least one of the primitives of the current subset of primitives; and when it is determined that there is another primitive that is not yet allocated to a subset of primitives that is adjacent to and contiguous with at least one of the primitives of the current subset of primitives, adding that primitive to the subset of primitives; and continuing to determine if there is another primitive that is not yet allocated to a subset of primitives that is adjacent to and contiguous with at least one of the primitives of the current subset of primitives; and, if so, adding that primitive to the current subset of primitives;

until a condition for finishing the current subset of primitives and starting a new subset of primitives is reached.

The process of creating subsets of primitives is in an embodiment continued until all the primitives in the set of primitives being processed have been allocated to a subset of primitives.

If (when) no adjacent, contiguous unallocated primitive in the set of primitives is found, then the current subset of primitives that is being formed should be, and is in an embodiment, considered to be "complete", i.e. is finished, and a new subset of primitives is in an embodiment then started by selecting a new unallocated primitive to start a new subset of primitives with. This then has the effect of ensuring that each subset of primitives only includes contiguous primitives. Thus in an embodiment, if there are no unallocated contiguous primitives in the set of primitives for a subset of primitives, then a new subset of primitives is started.

Correspondingly, the subset creation process in an embodiment comprises:

starting a new subset of primitives when there are no primitives adjacent to and contiguous with the current subset of primitives that have not yet already been allocated to a subset of primitives.

In the case where there is more than one unallocated primitive that is contiguous with the (primitive(s) of) current subset of primitives that is being considered (e.g., and in an embodiment, that shares an edge with a primitive of the subset), then in an embodiment one of the contiguous primitives is selected to add to the subset of primitives. Which of the adjacent contiguous primitives to add to the subset can be selected in any desired and suitable manner. In an embodiment, this is done based on one or more selection criteria.

In an embodiment, a selection criteria for selecting an adjacent primitive to add to a subset of primitives comprises the facing directions of the candidate adjacent primitives that could be added to the subset and the facing direction of an existing primitive or primitives of the subset. In an embodiment the arrangement is to add primitives having similar facing directions, and in an embodiment coplanar primitives, to a subset of primitives. In other words, in an embodiment the arrangement will try to find and add to a subset of primitives, an adjacent primitive that faces the same or a similar direction to the existing primitive or primitives in the subset.

An advantage of selecting coplanar (and more closely coplanar) primitives for inclusion in a subset of primitives is that this can then be used, as will be discussed further below, to reduce the number of edges that need to be considered when using a subset of primitives to test the primitives that the subset of primitives relates to. It can also facilitate (again as will be discussed further below) eliminating geometry which all faces in the same direction (e.g. is always front-facing or always back-facing) more efficiently as it has the effect of forming subsets of primitives for which all the primitives will face in the same (or at least a similar) direction.

The facing directions of the primitives can be determined in any suitable and desired manner. In an embodiment this is done by considering (and comparing) the normal directions of the primitives in question, and most in an embodiment by considering the deviation of the normal for the new primitive relative to the normal direction for the subset of primitives (with, in an embodiment, the candidate adjacent primitive whose normal direction has the least deviation from the normal direction for the subset of primitives as it currently stands being selected as the primitive to add to the subset). The normal directions of the subset of primitives and of the candidate adjacent primitives can be determined, e.g., from the vertex positions of the primitives in the subset and of the candidate adjacent primitives.

In an embodiment, a selection criteria for selecting an adjacent primitive to add to a subset of primitives also or instead (and in an embodiment also) comprises the effect that the new primitive will have on the size of the subset of primitives, and in particular on the increase that there would be in the size of the subset of primitives if the adjacent primitive is added to the subset. In this case, the candidate adjacent primitive that would increase the size of the subset of primitives by the least amount is in an embodiment selected as the primitive to add to the subset of primitives. Thus, in an embodiment the arrangement will divide the set of primitives into subsets that are smaller in size, and in an embodiment that are as small in size as possible.

The "size" of a subset of primitives in this regard can be considered and assessed in any appropriate and desired manner. It is in an embodiment considered in terms of the size of the bounding volume (box) for the subset of primitives. The size may not be a volume itself, but could, and in an embodiment does, also bear some relation to, e.g. the area occupied by the subset of primitives. This will then allow for coplanar (axis aligned) subsets of primitives (which would accordingly have a "zero-volume" bounding box, but a bounding rectangle having a particular area). Suitable measures for the size of a subset of primitives comprise, e.g., the sum of the axis extents of the bounding box for the subset of primitives, and/or the surface area of the bounding box for the subset of primitives.

In an embodiment, where there is more than one candidate adjacent primitive to add to a current subset of primitives being created, the adjacent primitive with the least normal deviation from the normal direction for the current subset of primitives is selected as the primitive to add to the subset, or, if that is unable to distinguish the candidate adjacent primitives, then the candidate adjacent primitive with the smallest bounding box when added to the current subset of primitives (i.e. that will increase the size of the subset of primitives by the least amount) is selected as the adjacent primitive to add to the subset of primitives.

When a primitive is added to a subset of primitives, then in an embodiment it is marked as having been allocated to a subset of primitives, so that it will no longer be considered for the primitive set subdivision process.

In an embodiment, as well as a subset of primitives containing only contiguous primitives (such that a new subset is created whenever there are no remaining unallocated contiguous primitives for a given subset of primitives), the primitive subset creation process is also subject to one or more or other conditions or criteria for a "terminating" a subset of primitives (for starting a new subset of primitives).

In an embodiment, each subset of primitives is in an embodiment allowed to contain no more than a particular, in an embodiment selected, and in an embodiment predefined, number of vertices. In other words, the subsets of primitives are also not allowed to contain more than a particular, in an embodiment selected, in an embodiment predefined, maximum number of vertices.

Thus, in an embodiment, the primitive set subdivision process will continue to add adjacent primitives to a given subset of primitives, until the number of vertices for the subset reaches the maximum number of permitted vertices for a subset (assuming that there are sufficient contiguous adjacent primitives to include in the subset). Thus, in an embodiment, a new subset of primitives is created (started) when the number of vertices for the current subset of primitives reaches a particular, in an embodiment selected, maximum (threshold) number of vertices, even if there may be further contiguous adjacent primitives to that current subset of primitives.

Capping the number of vertices that a subset of primitives can have correspondingly constrains each subset to contain no more than a particular maximum number of primitives (depending upon how many vertices there are in each primitive). Thus, in an embodiment, the number of primitives that can be included in a subset of primitives is capped at a particular, in an embodiment selected, in an embodiment predefined, maximum number of primitives.

Thus, correspondingly, in an embodiment, the process will continue to add adjacent primitives to a given subset of primitives, until the number of primitives in the subset reaches the maximum number of permitted primitives for a subset (assuming that there are sufficient contiguous adjacent primitives to include in the subset). Thus, in an embodiment, a new subset of primitives is created (started) when the number of primitives in the current subset of primitives reaches a particular, in an embodiment selected, maximum (threshold) number of primitives, even if there may be further contiguous adjacent primitives that could be added to that current subset of primitives.

Capping the number of vertices that a subset of primitives can have (and correspondingly the number of primitives that a subset of primitives can contain) facilitates constraining the amount of data that needs to be stored for each subset of primitives, and, as will be discussed further below, can be used to ensure that the required data for each subset of primitives can be stored in the same, fixed size data structure for each subset (in other words, that each primitive subset "description" can be a fixed size data structure).

A further advantage of capping the number of vertices (primitives) that can be in a given subset of primitives is that that constrains the possible topologies that a given subset of primitives can have (e.g. to a relatively small number of possible topologies). This then facilitates, as will be discussed further below, being able to encode the relevant information representing the subset of primitives in a more efficient and compact manner in the subset descriptions (sets of data).

The (maximum) number of vertices (and correspondingly primitives) that each subset can have can be selected as desired. In an embodiment, each subset can contain up to a maximum of six vertices (such that correspondingly, where the primitives are triangles, each subset will contain up to four triangles). Other arrangements would, of course, be possible.

It should be noted here that even where the number of vertices and primitives that a subset can contain is capped, in an embodiment, each subset is capable of containing (allowed to contain) plural primitives (up to the maximum number of primitives, if any) (so long as there are sufficient adjacent, contiguous primitives to combine to form the subset). This facilitates reducing the size of the data that needs to be stored for representing the set of primitives.

The data that is stored for each subset of primitives comprises data representative of the primitives of the subset of primitives and data indicating the volume of space that the subset of primitives falls within.

The data representative of the primitives of a subset of primitives can be any suitable and desired data that can represent the primitives of the subset of primitives. In an embodiment, this data at least allows the outer edges of the subset of (contiguous) primitives to be determined.

In an embodiment, the data representative of the primitives of the subset of primitives comprises data indicating a set of vertices for the subset of primitives. In this case, this data could simply indicate the vertices that are used by the primitives of the subset of primitives (and in an embodiment this is the case). However, as will be discussed further below in embodiments a reduced set of vertices can be, and is in an embodiment, stored for a subset of primitives, e.g., and in an embodiment, for particular, selected subsets of primitives, e.g., and in an embodiment, that meet a particular, in an embodiment selected, in an embodiment predetermined, condition or conditions.

In an embodiment the data indicating a set of vertices for a subset of primitives in an embodiment indicates a set of vertex positions for the subset of primitives (i.e. indicates (allows to be determined) the positions of the vertices in question). It could also indicate (allow to be determined) other data for the vertices, but that is not necessary.

The data indicating vertices for the primitives of a subset of primitives in an embodiment comprises a vertex index for each vertex to be indicated, that references a set of vertices to be used for the graphics processing output in question.

In this case, the vertex indices could index the original set of vertices that is defined for the graphics processing output in question. However, in an embodiment, a modified set (list) of vertices is prepared for this purpose, that includes only unique vertex positions (i.e. that removes any duplication of vertices that have the same position (e.g. where two or more vertices (e.g. from different primitives) share the same vertex position—this could be the case, e.g., where two primitives that share a corner or an edge face in different directions)).

Thus, in an embodiment, the set of vertices defined for the graphics processing output in question is processed to provide a set (a list) of unique vertex positions for the graphics processing output, and then the data that is stored for each subset of primitives indexes the vertices (the vertex positions) in the modified set (list) of vertices.

Thus, in an embodiment, the vertex data that is stored for a vertex for a subset of primitives comprises an index that indexes into a set of unique vertex positions to indicate the position of the vertex in question (which set of unique vertex positions is, e.g., and in an embodiment, prepared from the original set of vertices that is defined for the graphics processing output in question).

Representing the vertices for a subset of primitives using an index into a set of unique vertex positions helps to facilitate representing the required data for the subsets of primitives in a more compact fashion.

Other arrangements would, of course, be possible.

In an embodiment, data indicating vertices that are used by the primitives of the subset of primitives, together with some data indicative of the topology of the primitives in the subset of primitives is stored for a subset of primitives. As will be discussed further below, this facilitates storing the information representative of the primitives of the subset of primitives in a more compact (and thus efficient) manner.

Thus, in an embodiment, the data that is stored for each subset of primitives comprises a set of vertex positions (in an embodiment in the form of a set of vertex indices) for the subset of primitives and additional topology data that, together with the vertex positions, can be used to determine the topology of the primitives in the subset of primitives in question.

In an embodiment, the topology information comprises an indication of a number of primitives in the subset of primitives, an indication of the number of edges of the first primitive in the subset of primitives, an indication of the number of edges of the second primitive in the subset of primitives (if present), an indication of the edge that the third primitive (if present) in the subset of primitives attaches to, and an indication of the two vertices that the fourth primitive in the subset of primitives (if present) attaches to (and so on, where a primitive subset may (and does) contain more than four primitives).

Other arrangements would, of course, be possible.

In an embodiment, the data indicative of or representing the vertices stored for a subset of primitives is stored in a particular, in an embodiment predefined, order, and in an embodiment in an order that facilitates the determination of the topology of the subset of primitives in question. Most in an embodiment, the vertices (e.g., and in an embodiment, the indexes for the vertices (or vertex positions)) are stored in the order that they (the vertices) are connected in. Furthermore, in an embodiment the second primitive of a subset of primitives (if any) is defined to attach to a particular, in an embodiment predefined, edge of the first primitive of the subset.

This further facilitates encoding the topology of the subset of primitives in a more compact manner.

Thus, in an embodiment, the data representative of the primitives that is stored for a (and for each) subset of primitives comprises a set of position indices indicating vertex positions for the subset of primitives, together with additional data indicative of the topology of the subset of primitives, which, together, can be used to determine the topology of the subset of primitives, and in particular, and in an embodiment, at least the positions of the outer edges of the subset of primitives.

As will be discussed further below, this then facilitates storing in a compact and efficient manner, sufficient data to allow it to be determined, for example, whether a ray (e.g.) cast between two positions will intersect the subset of primitives in question or not.

The data that is stored for a subset of primitives that represents the volume of space that the subset of primitives falls within (occupies) can take any suitable and desired form. In an embodiment, this data indicates a bounding volume for the subset of primitives, and most in an embodiment an axis aligned bounding volume for the subset of primitives. Thus, in an embodiment, minimum and maximum x, y and z values are stored for each subset of primitives, indicating the extent of the subset of primitives in each respective axis direction. For example, and in an embodiment, the minimum and maximum values in each axis direction (e.g. x, y, z) for all the vertices that the subset of primitives includes are determined and stored as indicating the region of space that the subset of primitives relates to (encompasses).

Other arrangements, such as more sophisticated forms of bounding volume, would, of course, be possible.

In an embodiment, the primitive subset data is stored in a fixed sized data structure. This then facilitates addressing, etc., of the data for a given subset of primitives.

Thus, in an embodiment there is a fixed set of data (amount of data capacity) that is set aside for storing the data for each subset of primitives. This fixed amount of data should be able to store the maximum possible required amount of data that may be needed for a subset, e.g. the maximum amount of vertex position indices and topology data that may be required. Where a given subset of primitives does not require the maximum amount of data to be stored for it (e.g. because the subset of primitives contains fewer than the maximum permitted number of vertices and/or primitives), then in an embodiment any unused data capacity is padded with appropriate dummy or default values, or otherwise contains an indicator such as a flag that identifies and indicates the presence of unused ("invalid") data in the set of data for the subset of primitives in question.

Other arrangements would, of course, be possible.

While it would be possible simply to store an index or other indication for each vertex of each primitive of a subset of primitives for a subset of primitives (and in an embodiment this is done), in an embodiment, it is determined whether any adjacent, contiguous primitives to be included in a subset of primitives can be combined to form a single larger primitive corresponding to the pair of adjacent, contiguous primitives. This will then have the effect of, e.g., reducing the number of edges that may need to be tested for a subset of primitives, when performing, e.g., visibility tests for the subset of primitives (as will be discussed further below).

For example, a pair of triangles could be combined to form a rectangle, such that there may then only be the four edges of the rectangle to test, rather than two triangles (and thus six edges) to test.

Thus, in an embodiment, it is determined whether any primitives in a subset of primitives can be merged (combined) to reduce the number of primitives in the subset (and if they can, the primitives are in an embodiment merged (combined)).

Such merging of primitives in a subset of primitives can be determined in any suitable and desired manner. In an embodiment, primitives in a subset of primitives are merged into a single primitive if the primitives meet one or more particular, and in an embodiment selected, in an embodiment predetermined, criteria or conditions.

In an embodiment, primitives in a subset of primitives are (potentially) merged so as to try to (potentially) remove shared edges between primitives in a subset of primitives.

Thus, in an embodiment, a condition for (potentially) merging primitives in a subset of primitives is that the primitives share an edge (have (a pair of) co-linear vertices).

In an embodiment, the facing direction of the primitives is also or instead (and in an embodiment also) used as a criteria when deciding whether to merge primitives or not. In an embodiment contiguous primitives, e.g., and in an embodiment, that share an edge, are merged if their facing directions are sufficiently similar, but are not merged if their facing directions are not sufficiently similar.

Thus, in an embodiment, two primitives are merged to a single primitive for the purposes of a subset of primitives, if the two primitives are coplanar and share an edge (have co-linear vertices). This will then have the effect of merging primitives with a shared edge that face in the same direction.

It would also be possible to (potentially) merge primitives that are not exactly coplanar, e.g. where it can be safely guaranteed that the primitives have sufficiently similar facing directions for the purposes of the testing that they are to be subjected to/used for (e.g. and in an embodiment, in the case of visibility testing for shadowing, that all rays from the light source being considered will hit the same faces (i.e. the back faces or the front faces, depending on convention) of the primitives in question). If that is the case, then the primitives can (safely) be merged to eliminate their interior edges.

Thus, in an embodiment, a or the light direction is used as a criteria when considering whether or not to merge two primitives in a subset of primitives to form a single larger primitive. This would then allow non-coplanar primitives to (potentially) be merged as well.

In an embodiment, the primitives also have to be convex for them to be able to be merged.

Other arrangements would, of course, be possible.

Where primitives in a subset of primitives are merged, then the data that is stored that is representative of the primitives of the subset of primitives in an embodiment represents (is representative of) the primitives of the subset of primitives in their "merged" form. Thus, for example, the data will include vertex indications (e.g. indices) for the vertices of the resultant "merged" primitive(s) (rather than the original, un-merged primitives) and for any other primitives in the subset, and indicate the topology of the "merged" primitive(s) (rather than the original, un-merged primitives), and of any other primitives in the subset.

The data for the set of primitives that is being processed can be stored in any suitable and desired manner, e.g. in any suitable and desired (overall) data structure.

In an embodiment, the data for the subsets of primitives is stored as a tree representation for representing the set of primitives, with each leaf node of the tree representing one of the subsets that the set of primitives has been divided into, and there being stored for each leaf node of the tree, data for the corresponding subset of primitives as discussed above.

Thus, in an embodiment, the method of the technology described herein comprises (and the processing circuitry is configured to):

dividing the set of primitives into plural subsets of primitives;

generating a tree representation for representing the set of primitives, the tree representation being configured such that each leaf node of the tree represents one of the sub-sets that the set of primitives has been divided into, and each parent node of the tree represents a sub-set of primitives corresponding to the combination of the sub-sets of primitives of all of its child nodes;

and generating and storing for each leaf node of the tree representation, data representative of the primitives of the subset of primitives that the leaf node represents, and data indicating the volume of space that the sub-set of primitives that the leaf node represents falls within.

Correspondingly, a third embodiment of the technology described herein comprises a data structure representing a set of plural primitives to be processed for a frame for output in a graphics processing system, each primitive in the set of primitives being being associated with one or more vertices, the data structure comprising:

data representing a tree representation representing the set of plural primitives; wherein:

the tree representation that the data represents is configured such that each leaf node of the tree represents one of a plurality of subsets of primitives that the set of primitives has been divided into, and each parent node of the tree represents a sub-set of primitives corresponding to the combination of the sub-sets of primitives of all of its child nodes;

wherein the set of primitives is divided into plural subsets of primitives such that each primitive is allocated into one subset of primitives only, and each subset of primitives contains only contiguous primitives;

and the data that is stored for each leaf node of the tree representation comprises:

data representative of the primitives of the subset of primitives that the leaf node represents, and data indicating the volume of space that the subset of primitives that the leaf node represents falls within.

As will be discussed further below, representing the set of primitives using such a tree structure facilitates more efficiently identifying subsets of primitives that need to be considered.

Thus, once the set of primitives has been divided into plural subsets of primitives, a tree representation of the set of primitives is in an embodiment generated, with each leaf node of the tree corresponding to a respective subset that the set of primitives has been divided into (thus there will be the same number of leaf nodes as there are subsets of primitives).

The subsets of primitives can be arranged as respective leaf nodes in any desired and suitable manner. In an embodiment the primitive subsets are arranged as (assigned to) the leaf nodes based on their spatial location(s) (and in an embodiment so as to minimise the "size" of the nodes of the tree representation(s) (as discussed above in relation to selecting primitives to add to a subset of primitives)).

Each leaf node of the tree each represents a given subset that the set of primitives has been divided into. Each higher node in the tree represents the combination of the sub-sets of primitives that each of its child nodes represents. Thus, for example, a parent node that has N leaf nodes as its child nodes will represent the combination of the N sub-sets of primitives that the N child leaf nodes represent. This is repeated up the tree representation for each higher node (such that the root node of the tree will represent the entire set of primitives in question).

Each node of the tree may have any desired and suitable number of child nodes. In an embodiment, the tree structure is balanced and/or symmetrical. In an embodiment, the tree structure has power of two number of leaf nodes.

In an embodiment, the tree structure is configured to be wide and shallow, i.e. such that each parent node has a large number of child nodes (the tree has a relatively high branching factor). In an embodiment each parent node has at least 64 child nodes, most in an embodiment 128 child nodes.

Correspondingly, in an embodiment, the tree structure only has a relatively small number of levels of hierarchy between the leaf nodes and the root node, such as 0, 1, 2, 3 or 4 levels between the leaf nodes and the root node.

Other arrangements for the tree structure would be possible, if desired.

Where there are more subsets of primitives than a single such tree structure (e.g. having 128 leaf nodes) can support, then in an embodiment plural tree structures (representations) are generated, each representing a respective group of the subsets of primitives that the set of primitives has been divided into.

Where more than one tree structure is required for a set of primitives, then in an embodiment the subsets of primitives are allocated to respective tree structures based on the "size" that the overall groups of primitives that each tree structure represents will occupy. Most in an embodiment the arrangement is such that the subsets of primitives for each tree structure are as small in (overall) "size" as possible.

Thus, in an embodiment, the set of primitives is divided into plural groups of subsets of primitives, with a separate data structure being stored for each such group of subsets of primitives, and the set of primitives is divided into the groups of subsets of primitives such that each respective group of subsets of primitives occupies as small a size as possible (i.e. the subsets of primitives are organised into groups of subsets of primitives based on the size of a and of each group of subsets of primitives).

For each leaf node of the tree representation, data representative of the primitives of the sub-set of primitives that the leaf node represents and data indicative of the volume of space that that sub-set of primitives falls within, is stored.

For each higher (i.e. non-leaf) node, data indicative of the volume of space that the subsets of primitives that each of its child nodes collectively falls within (occupies) is in an embodiment stored. In an embodiment this is all that is stored for each higher node, but other data could be stored for the higher nodes as well, if desired. For example, where a more "general" tree representation, e.g. with a non-constant branching factor, is used, then it may be desirable to store the number of child nodes, and a reference to the first child node, for each higher level node in the tree.

Other data could also be stored for a node and/or for each node, if desired.

The tree representation for the set of primitives can be built (the data for it generated) in any desired and suitable manner. In an embodiment, the leaf nodes are built first, using the data for the respective sub-set of primitives for the leaf node in question, with the (and each) higher level node (in an embodiment including the root node) then being built from its respective child nodes (by "merging" its respective child nodes). Thus in an embodiment, the data for a "parent" node is determined and by combining or merging the (relevant) data from its child nodes (in an appropriate manner). "Constructing" higher level nodes (parent nodes) from their respective child nodes helps to minimise the number of passes over the "raw" data that will be required.

When merging two (or more) child nodes, then the merging can be done in any suitable and desired manner to provide a "merged" set of data for the higher level (parent) node.

So far as the data indicating the volume that the sub-set of primitives falls within (occupies) is concerned, the volume for a higher level node is in an embodiment determined from the respective volumes (e.g. bounding volumes) for the child nodes in question. For example, a bounding volume for the parent node that entirely encompasses all the bounding volumes of the child nodes could be determined (and in an embodiment this is done). In this case, the bounding volume for the parent node could be, and is in an embodiment, generating by taking the minimum and maximum vertex position values along each axis across all of the parent node's child nodes.

More sophisticated arrangements, such as more sophisticated forms of bounding volume could be used or desired. It would also be possible, e.g., to retain the separate bounding volumes of the child nodes for a parent node, or to only merge some but not all of the child node bounding volumes for a parent node, if desired. This may be appropriate where, e.g., the bounding volumes of the child nodes do not overlap at all.

The above describes the process of subdividing a set of primitives to be rendered and generating data, e.g., in the form of a tree representation(s), representing the subsets of primitives. The technology described herein also extends to then using the data, e.g. tree representation(s), representing the subsets of primitives, e.g., and in an embodiment, to determine (identify) ones of the subsets of primitives to be processed when processing the set of primitives to generate (when generating) an output frame.

Thus, in an embodiment, the method of the technology described herein further comprises using, and the apparatus of the technology described herein is further configured to use, the data representing the subsets of primitives to determine a set or sets of subsets of primitives to be processed when processing the set of primitives for the output frame.

Correspondingly, another embodiment of the technology described herein comprises a method of determining a set of subsets of primitives to be processed when processing a set of plural primitives to be processed for a frame for output in a graphics processing system, the method comprising:

using data representing subsets of primitives of the set of plural primitives to determine a set of subsets of primitives to be processed when processing the set of primitives for the output frame; wherein:

the set of primitives is divided into plural subsets of primitives, such that each primitive is allocated into one subset of primitives only, and each subset of primitives contains only contiguous primitives;

and the data that is stored for each subset of primitives that the set of primitives has been divided into, comprises:

data representative of the primitives of the subset of primitives, and data indicating the volume of space that the subset of primitives falls within.

A further embodiment of the technology described herein comprises an apparatus for determining a set of subsets of primitives to be processed when processing a set of plural primitives to be processed for a frame for output in a graphics processing system, the apparatus comprising:

processing circuitry configured to:

use data representing subsets of primitives of the set of plural primitives to determine a set of subsets of primitives to be processed when processing the set of primitives for the output frame;

wherein:

the set of primitives is divided into plural subsets of primitives, such that each primitive is allocated into one subset of primitives only, and each subset of primitives contains only contiguous primitives;

and the data that is stored for each subset of primitives that the set of primitives has been divided into comprises: data representative of the primitives of the subset of primitives, and data indicating the volume of space that the subset of primitives falls within.

As will be appreciated by those skilled in the art, these embodiments and embodiments of the technology described herein can and in an embodiment do include any one or more or all of the features of the technology described herein described herein, as appropriate. Thus, for example the data representing the subsets of primitives is in an embodiment of the form discussed above, and most in an embodiment is in the form of a tree representation, with the data stored for the nodes of the tree in an embodiment being of the form discussed above.

In these embodiments and embodiments of the technology described herein, either a single set of subsets of primitives to be processed could be determined, or plural sets of subsets of primitives to be processed could be determined. For example, a set of subsets of primitives to be processed could be determined for an output frame as a whole, or a respective (separate) subset of primitives to be processed could be determined for each of plural regions that an output frame to be generated is divided into, e.g. for processing purposes (and in an embodiment, this is what is done).

A set of subsets of primitives to be processed, e.g. for a region, can be determined using the data representing the subsets of primitives in any suitable and desired manner.

In an embodiment, this is done using the data indicating the volume of space that the subsets of primitives fall within. In an embodiment the volume of space that a subset of primitives is indicated as falling within is compared with a particular, in an embodiment selected, "test" volume or area of space of interest, such as a particular, in an embodiment selected, bounding frustum, to determine if the subset of primitives falls at least partially within the "test" volume or area. The subset of primitives is in an embodiment then either included or not included in the set of subsets of primitives to be processed accordingly (e.g., and in an embodiment, such that a subset of primitives is included in the set of subsets of primitives to be processed if the volume space that it is indicated as occupying falls at least partially within the "test" volume or area that is being considered). This is in an embodiment repeated for plural, and in an embodiment for each, subset of primitives.

In these arrangements the test volume or area could, e.g., correspond to any desired volume of space or area for the output frame that is being generated. It could, for example, simply comprise the view frustum for the entire output frame. This would then, e.g., allow subsets of primitives that fall completely outside the view frustum to be excluded from the set of subsets of primitives to be processed for an output frame, thereby, e.g., facilitating avoiding processing subsets of primitives that fall completely outside the view frustum.

Additionally or alternatively, smaller test volumes or areas could be determined, e.g. for respective regions of an output frame to be generated, such as respective region-based bounding frustums or areas. This could then be used to determine a set of subsets of primitives to be processed for a region of the frame in question.

Thus there may, e.g., be a single test volume (e.g. bounding frustum) or area determined for the output frame that the subsets of primitives are to be tested against, or there could, e.g., be plural test volumes (e.g. bounding frustums) or areas determined for an output frame, e.g. for respective regions that the output frame has been divided into.

In an embodiment a separate test volume or area is determined and used for each of plural regions that the output frame has been divided into, e.g., and in an embodiment, for processing purposes.

The test volume(s) or areas can be constructed as desired, e.g. using any suitable known technique for determining bounding frustums.

The set of subsets of primitives to be processed for a given test volume or area is in an embodiment then determined by determining for each subset of primitives, whether or not it intersects the test volume or area in question. This is in an embodiment done using the data representing the volume of space that the subset of primitives falls within (e.g., and in an embodiment, by comparing that volume to the test volume (e.g. bounding frustum) or area in question).

It would be possible in this regard to update the volume of space that a subset of primitives falls within, e.g. based on the current vertex positions, before testing the volume of space that a subset falls within against a test volume, if desired (and in an embodiment, this is done).

This test volume testing can be performed in any desired and suitable manner. For example, in one embodiment it is done by clipping the, e.g., bounding volume for a subset of primitives, against the test volume, e.g. using a bounding volume-test volume intersection test, etc.

In an embodiment, it is determined whether there is a splitting plane for which the bounding volume for the subset of primitives lies on one side of the plane, and the test volume or area is on the other side of the plane. If such a "splitting plane" exists, then it may be, and is in an embodiment, concluded that the bounding volume for a subset of primitives does not fall at least partially within the test volume or area that is being considered. Correspondingly, if such a splitting plane does not exist, the subset of primitives is in an embodiment added to the set of subsets of primitives to be processed.

Where necessary, the bounding volume for a subset or group of subsets of primitives may be transformed to the appropriate screen space position before it is tested against the test volume. This may, use, e.g., a transformation matrix that provided as part of the vertex shading process.

In an embodiment any subset of primitives that is determined to intersect the (or any one of the) test volume(s) is in an embodiment then included in the determined set of subsets of primitives to be processed, e.g. for the frame region in question, but any subset of primitives that is determined not to intersect the (or any of the) test volume(s) is in an embodiment not included in the determined set of subsets of primitives to be processed (in question).

The determination of whether any subsets of primitives intersect a test volume (e.g. bounding frustum), e.g. for a frame region, can be performed as desired, and in any suitable manner. For example, it would be possible simply to test each subset of primitives against the test volume(s) in turn.

However, in an embodiment, more efficient testing mechanisms are used. Thus, in an embodiment, a hierarchical testing arrangement, in which larger size representations of subsets of primitives, and/or of the frame test volumes (e.g. regions) are first tested, and then progressively subdivided and tested again (if required), is used to make the testing process more efficient.

Thus, in an embodiment, the subset volume (intersection) testing process operates to iteratively test a test volume against progressively smaller representations of the subsets of primitives down to single subsets (testing subsets individually), discarding any subset representations that do not intersect (fall within) the test volume (at least in part), and then including in the set of subsets to be processed any subsets found to intersect (fall within) at least in part the test volume.

In such arrangements, there is in an embodiment a separate hierarchy for the test volume(s) and a separate hierarchy for the subsets of primitives.

In the case of the subsets of primitives, groups of plural (e.g. and in an embodiment adjacent) subsets of primitives could, e.g., be combined to form a larger "subset" of primitives and then the volume of space (a bounding volume) that a (and each) group of subsets of primitives falls within be determined and used as a bounding volume to test, with the bounding volumes of the individual subsets of primitives within a given group then subsequently being tested, if required. There could be multiple levels of groups of subsets of primitives, with each level being progressively bigger groupings to provide multiple levels of subset bounding volume representations to test against, if desired.

For the test volumes, test volumes for larger groupings of frame regions could first be tested and then test volumes for individual frame regions tested (if required), for example. For example, the test volumes for individual frame regions (e.g., tiles) could be used to construct bigger test volumes for sets of plural frame regions, e.g., for 2×2, 4×4 and/or 8×8 neighbouring frame regions (tiles).

Other arrangements would, of course, be possible.

In an embodiment, the data, e.g. the tree representation, representing the subsets of primitives is used to determine a set of subsets of primitives of the set of primitives to be processed for the frame that could cast a shadow in a given region of the output frame. As will be discussed further below, this then facilitates taking account of the effect of shadows when rendering frames for output.

Thus, in an embodiment, the method of the technology described herein further comprises using, and the apparatus of the technology described herein is further configured to use, the data representing the subsets of primitives to determine a set or sets of subsets of primitives to be processed when processing the set of primitives for the output frame that could cast a shadow in a given region or regions of the output frame.

Correspondingly, in an embodiment, the method of the technology described herein further comprises, and the apparatus of the technology described herein is further configured to when rendering a frame for output that includes a light source that could cast shadows, for at least one region of the frame being rendered:

determining a set of subsets of primitives of the subsets of primitives to be processed for the frame that could cast a shadow from a light source to be considered for the frame for the region of the frame being rendered using the data representing the subsets of primitives.

The region(s) of a frame that is considered can be any desired and suitable region(s) of the frame. It would be possible to consider the frame as a whole (in which case there would be a single region comprising the entire frame), but in an embodiment the frame is divided into plural smaller regions, and at least one, and in an embodiment plural (and potentially each), of those regions is processed in the manner of the present embodiment. In this case, the processing in the manner of the present embodiment may be performed for each region that the frame is divided into, or it may be performed for some but not all of the regions that the frame is divided into. Where a frame is processed as multiple frame regions, the processing is in an embodiment done on a region-by-region basis.

The regions of the frames that are considered can be any suitable and desired regions of the frames. In an embodiment, each frame region represents a different part (region) of the frame in question. Each region should ideally represent an appropriate portion (area) of the frame, such as a plurality of sampling positions within the frame. Suitable region sizes could be, e.g., 8×8, 16×16, 32×32 sampling positions in the frame. The frame regions are in an embodiment regularly sized and shaped, in an embodiment in the form of rectangles (including squares). However, this is not essential and other arrangements could be used if desired.

Where a frame is already sub-divided into regions for the purpose of its processing, then in an embodiment, each region of the frame that is considered corresponds to a region that the frame is otherwise divided into for processing purposes. This could be the case where, for example, the graphics processing system is a tile-based system and the graphics processing, etc., is to be carried out in a tile-based fashion, for example using a tile-based graphics processing unit.

Thus, in an embodiment, each region of the frame that is considered in these embodiments corresponds to one or more tiles of the frame. In an embodiment, each region that is considered corresponds to a (single) tile that a graphics processor or system that is generating the frame in question operates on and produces as its output (i.e. the regions are the tiles that the frames are divided into for processing (rendering) purposes), although other arrangements, such as each region comprising a plurality of tiles or a part of a tile, would be possible if desired.

Where the output frame is divided in plural regions, e.g. processing tiles, then while it would be possible to process each such region, e.g. tile, in the manner of the present embodiment, in an embodiment that is done for selected regions only, and in an embodiment only for regions that meet certain, in an embodiment selected, in an embodiment predefined, criteria or conditions. Most in an embodiment only those regions that it is determined could be lit by the light source in question are processed for the light source in this manner. Thus, the light source is in an embodiment culled against the frame regions to identify the frame regions that could be lit by the light source (to identify the frame regions that contain geometry that could be affected by the light source).

Thus in an embodiment, the frame being rendered is divided into (and is to be processed as) plural distinct regions, and it is first determined which of the regions that the frame has been divided into could be lit by the light source being considered, and then some or all (and in an embodiment each) of those determined frame regions are processed in the manner of the present embodiment.

The frame regions that could be lit by the light source being considered can be determined as desired. In an embodiment it is determined whether a (and each) region is within the light's volume of influence (with regions that are outside the volume of influence not being processed in the manner of the present embodiment). It would also or instead (and in an embodiment also) be possible for regions whose geometry all faces away from the light source to be discarded from processing in the manner of the present embodiment.

For a frame region that falls to be processed in the manner of the technology described herein, the set of subsets of primitives for the region that could cast a shadow from the light source can be determined in any suitable manner.

In an embodiment, this is done by determining whether a splitting plane for which the light source and the geometry to be lit are on one side of the plane, and the subset of primitives (i.e. the potentially occluding geometry) is on the other side of the plane, exists or not. If such a splitting plane exists, then it is determined that the subset of primitives in question should not cast a shadow for the geometry being considered, but if such a splitting plane does not exist, then the subset of primitives is considered as (potentially) being able to cast a shadow for the geometry (region) being considered, and so is, in an embodiment, added to the set of subsets of primitives that could cast a shadow from the light source.

In an embodiment this is done by determining a bounding frustum or frustums that (together) contain all the visible geometry in the frame region and the light source being considered. Such a frustum can be constructed as desired (e.g. using any suitable known technique for determining such frustums), for example, and in an embodiment, by determining a minimum and a maximum depth value of the geometry, as seem from the camera (view point) for the frame region (knowledge of the camera position and orientation will then allow a bounding volume for the geometry to be constructed) and then using that and, e.g., the area of the frame region and of the light source in question, to construct a bounding frustum (or frustums) for the light source in question. This can be done in view (camera) space or in world space.

In an embodiment, a single bounding frustum that contains all the visible geometry in the frame region and the light source being considered is generated for the frame region. In another embodiment, plural bounding frustums are generated for a frame region.

The set of subsets of primitives that could cast a shadow from the light source is in an embodiment then determined by determining for each subset of primitives, whether or not it intersects the light source bounding frustum (or at least one of the bounding frustums, where plural bounding frustums are being used) for the region. This is in an embodiment done using the data representing the volume of space that the subset of primitives falls within (e.g., and in an embodiment, by comparing that volume to the bounding frustum(s) in question).

Any subset of primitives that is determined to intersect the (or any one of the) light source bounding frustum(s) is in an embodiment then included in the determined set of subsets of primitives that could cast a shadow (affect the shadow being cast) in the frame region, but any subset of primitives that is determined not to intersect the (or any of the) bounding frustum(s) is in an embodiment not included in the determined set of subset of primitives that could affect the shadow being cast. (This is on the basis that to be able to cast a shadow in the frame region in question, a subset of primitives must intersect a bounding frustum that includes the light and the geometry for the frame region.)

The determination of whether any subsets of primitives could cast a shadow in a frame region, e.g. intersects a light source bounding frustum for a frame region, can be performed as desired, and in any suitable manner. For example, it would be possible simply to test each subset of primitives, e.g. against the bounding frustum(s), in turn.

However, in an embodiment, more efficient testing mechanisms are used. Thus, in an embodiment, a hierarchical testing arrangement, in which larger size representations of subsets of primitives, and/or of the frame regions, and/or of light source bounding frustums are first tested, and then progressively sub-divided and tested again (if required), is used to make the testing process more efficient.

Thus, in an embodiment, the light source bounding frustum intersection testing process operates to iteratively test a light source bounding frustum against progressively smaller representations of the subsets of primitives down to single subsets (testing subsets individually), discarding any subset representations that do not intersect the light source bounding frustum (at least in part), and then including in the set of subsets any subsets found to intersect at least in part the light source bounding frustum.

In such arrangements, there is in an embodiment a separate hierarchy for the frame region light source bounding frustums and a separate hierarchy for the subsets of primitives.

In the case of the subsets of primitives, groups of plural (e.g. and in an embodiment adjacent) subsets of primitives could, e.g., be combined to form a "larger" subsets of primitives and then the volume of space (a bounding volume) that a (and each) group of subsets of primitives falls within be determined and used as a bounding volume to test, with the bounding volumes of the individual subsets of primitives within a given group then subsequently being tested, if required. There could be multiple levels of groups of subsets of primitives, with each level being progressively bigger groupings to provide multiple levels of subset bounding volume representations to test against, if desired (and then being progressively sub-divided, as required).

For the frame regions, light source bounding frustums for larger groupings of frame regions could first be tested and then the individual frame regions light source bounding frustums tested (if required). For example, the light source bounding frustums for individual frame regions (e.g., tiles) could be used to construct bigger light source bounding frustums for sets of plural frame regions, e.g., for 2×2, 4×4 and/or 8×8 neighbouring frame regions (tiles).

In such an arrangement, higher-level (larger size) primitive subset representations (e.g. bounding volumes) are first intersection tested against higher-level (larger size) frame region light source bounding frustums (such as, and in an embodiment, light source bounding frustums for sets of 2×2 (and/or 4×4, 8×8, etc.) neighbouring frame regions (tiles)), then any higher level primitive subset representations (e.g. bounding volumes) that are not culled by the first stage are intersection tested against the appropriate individual frame region light source bounding frustums, and, finally, the individual primitive subsets of the higher level primitive subset representations that have not yet been culled are intersection tested against the individual frame region light source bounding frustums.

Correspondingly, where the determination of whether a subset of primitives could cast a shadow in a frame region comprises determining whether a splitting plane that lies between the geometry for a frame region and a potentially occluding subset of primitives exists, then in an embodiment, a hierarchical testing arrangement, in which larger size representations of subsets of primitives, and of the frame regions are first tested, and then progressively subdivided and tested again (if required), is used to make the testing process more efficient. In this case, the testing process in an embodiment operates to iteratively test progressively smaller representations of the subsets of primitives down to single subsets (testing subsets individually), discarding the subset representations for which a "splitting plane" exists, and then including in the set of subsets any subsets for which a "splitting plane" is not found to exist.

Again, there is in an embodiment a separate hierarchy for the frame regions and a separate hierarchy for the subsets of primitives. In the case of the subsets of primitives, in an embodiment groups of plural subsets of primitives are combined, in the same manner as that discussed above. For the frame regions, in an embodiment again, respective sets of plural frame regions, e.g. 2×2, 4×4 and/or 8×8 neighbouring frame regions (tiles) are considered and then progressively subdivided.

In such an embodiment, higher-level (larger size) primitive subset representations (e.g. bounding volumes) are first "splitting plane" tested against higher level (larger size) frame regions (such as, and in an embodiment, sets of 2×2 and/or 4×4, 8×8, etc.) neighbouring frame regions (tiles), and then any higher level primitive subset representations that are not culled by the first stage are tested against appropriate individual frame regions, and finally the individual primitive subsets of the higher level primitive subset representations that have not yet been culled are tested against the individual frame regions.

Other arrangements would, of course, be possible.

Other culling operations could also or instead (and in an embodiment also) be used to identify subsets of primitives that do not need to be included in a set of primitives to be processed (e.g. that could cast a shadow in a frame region), if desired. For example, and in an embodiment, the bounding volumes of the subsets of primitives could be tested against the volume of influence of the light source in question, with any subsets of primitives that fall outside the light volume of influence then being culled (not considered further and not included in a set of subsets of primitives to be processed). This test is in an embodiment performed before testing the subsets of primitives against the light source bounding frustums for the frame regions, such that it can be used to cull subsets of primitives from having to undergo that testing.

In an embodiment, it is also determined whether a subset of primitives can be guaranteed to only contain primitives that are all facing in the same, particular, in an embodiment selected, direction (e.g. contains primitives that are all guaranteed to be front-facing, or contains primitives that are all guaranteed to be back-facing), with such subsets of primitives then, e.g. either being included or discarded from the subsets of primitives to be processed further. The facing directions of the primitives may be determined from their normals, for example. This would then allow, e.g., subsets of primitives that contain only front-facing (or only back-facing) primitives to be discarded from further processing.

In such an embodiment, subsets of primitives (and in an embodiment each subset of primitives) are tested to determine whether all the primitives in the subset of primitives are guaranteed to be front-facing, and, in an embodiment, any subsets of primitives whose primitives are all guaranteed to be front-facing are discarded from further processing.

Again, this process is in an embodiment performed before testing the subsets of primitives against the light source bounding frustums, so that any subsets of primitives whose primitives are all facing in the "discard" direction, can be discarded before undergoing any light source bounding frustum testing.

In an embodiment it is determined whether all the primitives in a subset of primitives are guaranteed to be back facing, and if so, this is recorded for the subset of primitives, and then in an embodiment used to control later processing of that subset of primitives, such as, and in an embodiment, to omit the testing of interior edges for such a subset of primitives (as those interior edges will accordingly be guaranteed to be non-silhouette edges).

The data representing the subsets of primitives can be considered and processed to determine a set or sets of subsets of primitives to be processed in any suitable and desired manner.

Where that data is in the form of a tree representation then the tree representation is in an embodiment used to determine the set or sets of subsets of primitives to be processed by considering nodes of the tree in turn, in an embodiment starting with the root node and working down the tree towards the leaf nodes (if required).

When a node of the tree is to be considered, it is in an embodiment tested, e.g. against the test volume (frustum) in question. Most in an embodiment the volume (region) of space that the sub-set(s) of primitives for a node is indicated to fall within is tested, e.g. against the volume (frustum) in question to determine if any of that volume (region) falls within the test (volume) (frustum) or not. Thus, in an embodiment, the bounding volume for a node is tested to determine if any part of the bounding volume falls within, e.g., a given particular frustum (test volume).

The result of the test is in an embodiment used to determine whether to include the sub-set(s) of primitives for the node in the set of subsets of primitives to be processed. It is in an embodiment also or instead used to determine whether and how to continue the traversal of the tree.

Most in an embodiment if a node passes the test completely (e.g. its bounding volume is completely within the test volume (frustum), the sub-set(s) of primitives for the node are then included in (added to) the set of subsets of primitives to be processed. In this case the traversal of the tree in an embodiment then continues at the parent of the accepted node (and thus moves to the next child node of that parent node still to be tested (if any)).

Correspondingly, if a node fails the test completely (e.g. its bounding volume is completely outside the test volume (frustum)), the sub-set(s) of primitives for the node are in an embodiment not included in (added to) the set of subsets of primitives to be processed. The traversal of the tree in an embodiment then continues at the parent of the rejected node (and thus moves to the next child node of the parent node of the rejected node still to be tested (if any)).

If a node that is not a leaf node partially passes the test (e.g. its bounding volume is only partially (but not fully) within the test volume (frustum)), then in an embodiment the sub-set(s) of primitives for the node are not included in the set of subsets of primitives to be processed at that stage, but instead the traversal of the tree is in an embodiment continued to the child nodes of the node in question (which are then tested themselves).

Thus, in the case of the root node, if that node fully passes the test in question, the entire set of subsets of primitives are in an embodiment simply included in the set of subsets of primitives to be processed, and if the root node fails the test, the entire set of subsets of primitives is in an embodiment rejected and not processed further, but if the root node only partially passes the test, the tree is in an embodiment traversed to then test the child nodes of the root node.

If a leaf node is found to at least partially pass the test in question (e.g. its bounding volume is at least partially within the test volume (frustum)), then the sub-set of primitives for the leaf node is in an embodiment included in the set of subsets of primitives to be processed. Again the traversal of the tree in an embodiment then continues at the parent of the accepted leaf node (and thus moves to the next leaf node of that parent node still to be tested (if any)).

This process is in an embodiment repeated until the tree has been completely traversed (until all the nodes in the tree that need to be tested, have been tested).

The output of the processing (testing) of the subsets of primitives, e.g. the tree traversal, should be, and is in an embodiment, a set or sets of subsets of primitives to be processed. This output can take any desired and suitable form, but in an embodiment comprises a list or lists of subsets of primitives indicating the subsets of primitives of the set of primitives to be processed.

Thus, the processing (e.g. testing) of the subsets of primitives, e.g. the tree traversal, in an embodiment provides a set (a list) of subsets of primitives to be processed, e.g. for a given frame region.

The indicated (determined) set (or sets) of subsets of primitives is in an embodiment then processed.

The determined set or sets of subsets of primitives can then be processed in any suitable and desired manner (can be used when generating the output frame in any suitable and desired manner).

This processing in an embodiment uses the information representative of the primitives of the subsets of primitives.

Thus, in an embodiment, the method of the technology described herein further comprises using, and the apparatus of the technology described herein is further configured to use, the data representative of the primitives of a subset of primitives, to process the subset of primitives. Correspondingly, in an embodiment, the method of the technology described herein further comprises, and the apparatus of the technology described herein is further configured to, use the data representative of the primitives of a subset of primitives to process (when processing) the subset of primitives.

The processing of the subset(s) of primitives may, and in an embodiment does, depend on the purpose that the subsets of primitives to be processed were identified for.

For example, where the subsets of primitives were tested to identify subsets of primitives to be rendered, the relevant subsets of primitives could be, and are in an embodiment, then rendered.

In this case, the list of subsets of primitives to be rendered may then, e.g., and in an embodiment, be provided to the rendering process (e.g. to the graphics processing unit (GPU) (graphics processor)) to indicate the subsets of primitives to be processed for the set of primitives (e.g. draw call) in question. The, e.g. GPU, in an embodiment then processes (renders) the indicated subsets of primitives in the normal fashion for the graphics processing system in question to provide the desired render output. This processing can comprise, e.g., vertex shading, rasterisation, rendering (fragment shading), etc., as desired.

When processing the subsets of primitives (in whatever required manner), the stored information for each subset of primitives in the set of subsets of primitives to be processed is in an embodiment used in an appropriate manner to allow the subsets of primitives to be processed appropriately. In an embodiment, this comprises using the information representative of the primitives in a (and each) subset of primitives (such as the vertex indices and any topology information) to, in effect, (re-)construct the primitives of the subset of primitives in question such that those primitives can then be processed in the desired manner. Thus, in an embodiment, when a subset of primitives in the set of subsets of primitives to be processed falls to be processed, the data that is stored for that subset of primitives is (appropriately) decoded to allow the primitives of the subset of primitives to be processed in the desired manner.

In the case where the primitive subsets information is used to determine a set of the subsets of primitives to be processed for a frame that could cast a shadow from a light source to be considered for the frame for a region of the frame being rendered, the subsets of primitives in the determined set of subsets of primitives to be processed are in an embodiment then processed to (used to) determine a light source visibility parameter for each sampling position of the frame region in question (which light source visibility parameter in an embodiment can then be, and is in an embodiment then, used to simulate the effect of shadows when rendering the frame region for output).

Thus, in an embodiment, the method of the technology described herein further comprises using, and the apparatus of the technology described herein is further configured to use, the data representing the subsets of primitives to determine for each sampling position of a set of sampling positions (e.g. and in an embodiment for a region of a frame being rendered), a light source visibility parameter.

Correspondingly, in an embodiment, the method of the technology described herein further comprises, and the apparatus of the technology described herein is further configured to, when rendering a frame for output that includes a light source that could cast shadows, for at least one region of the frame being rendered:

for each sampling position of a set of sampling positions for the region of the frame being rendered, determining a light source visibility parameter using a determined set of subsets of primitives of the subsets of primitives to be processed for the frame that could cast a shadow from the light source for the frame for the region of the frame, using the data representing the subsets of primitives.

Correspondingly, in an embodiment, the method of the technology described herein further comprises, and the apparatus of the technology described herein is further configured to, when rendering a frame for output that includes a light source that could cast shadows, for at least one region of the frame being rendered:

using the data representative of the subsets of primitives to:

determine a set of the subsets of primitives to be processed for the frame that could cast a shadow from a light source to be considered for the frame for the region of the frame being rendered; and for each sampling position of a set of sampling positions for the region of the frame being rendered, determine a light source visibility parameter using the determined set of subsets of primitives.

In these embodiments, the set of sampling positions of a region of the frame being rendered that a light source visibility parameter is determined for can be any desired and suitable set of sampling positions.

In an embodiment, the set of sampling positions of a region of the frame being rendered that a light source visibility parameter is determined for comprises the set of sampling positions that will be processed for the frame region when producing (rendering) the (e.g., and in an embodiment final) output for the frame region (thus, a light source visibility parameter value is in an embodiment determined for each (screen space) sampling position of the region of the frame (e.g. tile) being rendered). In an embodiment a visibility mask comprising one binary bit per sample point is generated. This will allow for more complex lighting evaluation later on, for example.

The light source visibility parameter that is determined for a sampling position in the frame region being considered from the determined set of subsets of primitives can be any desired and suitable parameter that can be used to provide a desired shadowing effect in the rendered output frame.

In one embodiment it is a value that can be (and that is to be) used to modulate the effect of the light source at the sampling position in question to provide (and to represent or simulate) the shadowing effect at that sampling position. In this case, the light contribution from the light source if it were completely unoccluded is in an embodiment multiplied by the light source visibility parameter to give a "net" light contribution from the light source to the frame region sampling position in question when rendering (shading) the frame region.

In an embodiment, the light source visibility parameter for a (and for each) frame region sampling position indicates directly the "net" light contribution from the light source to the frame region sampling position in question (and thus is to be used as the "net" light contribution from the light source to the frame region sampling position in question when rendering (shading) the frame region).

Other arrangements would, of course, be possible.

In an embodiment, the light source visibility parameter for a sampling position is representative of (is indicative of), and dependent upon, how much light from the light source will fall upon the sampling position in question. This parameter can then be used to simulate the effect of the light source at the sampling position in question when the output frame is rendered.

The light source visibility parameter for a sampling position can be determined as desired and in any suitable manner from the determined set of subsets of primitives for the frame region.

In an embodiment, it is estimated how much light from the light source will fall upon the frame region sampling position in question. This can be estimated as desired, but in an embodiment, it is in an embodiment based, at least in part, on whether and how much of the light source is visible at the frame region sampling point in question, i.e. whether any of the subsets of primitives in the determined set of subsets of primitives that could cast a shadow in the frame region will occlude the light source from the sampling position.

Whether and how much of the light source is visible at a frame region sampling point can be determined in any suitable and desired manner, but in an embodiment this is done by testing whether, for each of one or more sampling positions representing the position of the light source, a ray cast between the frame region sampling position in question and the light source sampling position would intersect a subset of primitives in the determined set of subsets of primitives that could cast a shadow at the frame region sampling position in question (i.e. could be occluded by any of the subsets of primitives in the determined set of subsets of primitives that could cast a shadow in the frame region or not).

In this process, the light source could be represented by a single sampling position (and in an embodiment, this is the case). This may be appropriate where the light source is a point source.

In an embodiment, the light source is represented by plural sampling positions. In this case, it is in an embodiment then tested for plural of (and in an embodiment for each of) the plural sampling positions that represent the light source, whether a ray cast between the frame region sampling position in question and the light source sampling position would intersect any subsets of primitives in the determined set of subsets of primitives that could cast a shadow at the frame region sampling position.

Using a plurality of sampling points to represent the light source allows area lights (i.e. light sources that have an area) to be considered and represented in an efficient and effective manner.

Where plural sampling positions are used to represent a light source then the sampling positions can be arranged in any suitable and desired fashion. In an embodiment, the sampling positions are arranged as an array of sampling positions that represents (and corresponds to) the light source in question.

The testing of whether a light source sampling point will be visible from the frame region sampling position can be done in any desired and suitable manner. It is in an embodiment done using a rasterisation operation.

Thus, in an embodiment, testing of whether a light source sampling positions will be visible from the frame region sampling position is done by rasterising the subsets of primitives in the determined set of shadow-casting subsets of primitives for the frame region onto a render target that corresponds to the light source sampling positions (with the frame region sampling position as the viewpoint).

The light source sampling position occlusion testing can be used to provide the light source visibility parameter to be used for the frame region sampling position in question in any desired and suitable manner.

In an embodiment, it is determined whether each light source sampling position is occluded or not.

The light source visibility parameter for the frame region sampling position in question is in an embodiment then determined, at least in part, from the number of light source sampling positions that were found to be visible (or found to be occluded) by the testing process at the frame region sampling position in question.

In one embodiment, the light source visibility parameter for each frame region sampling position is, or corresponds to, the ratio (the proportion) of the visible light source sampling positions to the total number of light source sampling positions at the frame region sampling position in question.

It would also be possible to derive more sophisticated measures of the light falling on the frame region sampling position from the light source sampling position occlusion testing, if desired. For example, for each non-occluded light source sampling position, a measure of the amount of light that will fall on the frame region sampling position from the light source sampling position in question could be determined, e.g. based on the distance (depth) of the frame region sampling position from the light source sampling position, and/or based on the amount of light that the light source sampling position in question is producing.

The above process should be repeated for each frame region sampling position that a light source visibility parameter is to be determined for.

The determined light source visibility parameters for the frame region sampling positions can be used as desired to simulate the (determined) effect of the shadows in the rendered output frame region. As discussed above, the determined light source visibility parameters are in an embodiment used to modulate the light source at the sampling positions when determining the output, rendered, colour to be used for the frame region (screen space) sampling positions.

Thus, in an embodiment, the method of the technology described herein further comprises (and the apparatus of the technology described herein is further configured to) using the determined light source visibility parameters for the region of the frame being rendered when rendering an output version of the frame region, and most in an embodiment to modulate the effect of the light source in question at each sampling position of the output version of the frame region.

The determined light source visibility parameters for a frame region could be provided as desired for use when rendering the frame region. For example, they could be written to (stored in) a frame region light source visibility buffer that is then, e.g., read (and used) in the (or a) subsequent rendering pass. In an embodiment, this is what is done. In this case, the light source visibility buffer could, e.g., be cached and retained "on-chip" for use in a subsequent rendering pass, or it could, e.g., be written out to main memory and then read back in when it is to be used.

Although the operation has been described above with particular reference to the processing in respect of a given light source, it will be appreciated that this operation can be extended to an arbitrary number of lights. In this case, the process to determine light source visibility parameters should be, and in an embodiment is, repeated for each light source that could cast a shadow in a frame region.

Similarly, although the technology described herein has been described above with particular reference to the processing of a single frame region, it will be appreciated that the process should be, and is in an embodiment, repeated for plural, and in an embodiment for each, region (e.g. tile) that the frame has been divided into (e.g. at least where a light source could cast shadows).

Similarly, the process is in an embodiment repeated for plural frames of a sequence of frames, e.g. and in an embodiment, for each frame of a sequence of frames to be rendered.

The subsets of primitives may be considered (tested) in "world-space" (and in an embodiment, this is what is done). However, depending on what hardware is available and what results are required, it would be possible to also or instead consider the subsets of primitives in (perform computations in) screen space, if desired.

As will be appreciated from the above, in an embodiment, the subdivision and representation of a set of primitives to be processed as subsets of primitives in the manner of the technology described herein is used to determine geometry that lies between sampling positions of a frame region and a light source that is casting light in the frame region, and then that set of geometry is tested to determine an approximate visibility for a set of rays cast from each sampling position for the frame region to the light source against the determined set of geometry.

However, the technology described herein can be used for other purposes as well. The subdivision of a set of primitives into subsets of primitives and the data that is stored for each subset of primitives in the technology described herein facilitates, in particular, the performance of tests where, for example, the subset of primitives can be considered as a whole, rather than there being any need to identify, for example, which individual primitive within a subset of primitives is, for example, intersected by a ray. Thus the technology described herein can be used in particular for operations that require, e.g., an "in/out" test in relation to the subsets of primitives, but which do not, e.g., require any finer grained identification or testing in relation to individual primitives within a given subset of primitives. Thus it can be used in particular for processes where each subset of primitives can be considered and tested as a whole.

The technology described herein also extends to a method and system that both creates and then uses the representations of subsets of primitives of a set of primitives to be rendered in the manners discussed above.

The methods and apparatus of the technology described herein can be implemented in any appropriate and desired manner, e.g. in hardware or software (or both), and in (and be included in) any appropriate device or component.

It will be appreciated from the above, that the embodiments of the technology described herein at least involve a number of processes that will be performed to generate the overall, final, output frame. For example, there will be a stage of building the subsets of primitives, followed by testing of those subsets of primitives to determine a set or sets of subsets of primitives to be processed, with the determined set(s) of subsets of primitives then being processed (used) in the desired manner.

These various processes may be carried out at different points in time and in different places in the overall graphics processing system, as and if desired.

For example, the process of building the subsets of primitives and the corresponding data structure(s) (e.g. bounding volume hierarchy topology) can be performed offline, in advance of the generation of the output frame in question, e.g. on a CPU (e.g. of the overall graphics processing system), or it could, e.g., be performed by the driver for the graphics processor that is to perform the graphics processing.

This processing may, and in an embodiment does, also comprise sorting the subsets of primitives into respective groups of subsets of primitives each of which will be represented by a given data structure, based on the volume that the individual groups of subsets of primitives that are represented by a given data structure will occupy.

The data representing the subsets of primitives may be stored in any suitable and desired memory, which memory may be configured in any suitable and desired manner. For example, it may be an on-chip buffer or it may be an external memory (and, indeed, may be more likely to be an external memory). Similarly, it may be dedicated memory for this purpose or it may be part of a memory that is used for other data as well. In an embodiment, this data is stored in main memory of the system that incorporates the graphics processor.

The process of using the information about the subsets of primitives to determine set(s) of subsets of primitives to be processed is in an embodiment then performed at "run time", in an embodiment by the graphics processor (e.g. and in an embodiment, operating as a General Purpose GPU (GPGPU) (using GPGPU compute code on the graphics processor).

In an embodiment, this processing comprises first updating the bounding volumes for the subsets of primitives using the current vertex positions. It would also be possible to allow for any animation of the geometry when updating the primitive subset bounding volumes from the current vertex positions, if desired.

It in an embodiment also includes, where appropriate, determining whether any of the subsets of primitives fall completely outside the light volume of influence (and culling any such subsets).

In an embodiment, there is also or instead a step of culling subsets of primitives for which it can be determined that all the primitives in the subset of primitives are guaranteed to be facing in the same particular direction (e.g. all front-facing).

Once the above "pre-culling" processes (if used) are complete, the subsets of primitive remaining (that haven't been culled) can then be tested as discussed above to determine a set or sets of subsets of primitives to be processed further.

The use of the determined set or sets of subsets of primitives when generating an output frame is in an embodiment then carried out on the graphics processor itself.

Thus, in an embodiment, the apparatus of the technology described herein may comprise one or more or all of: a host processor, a CPU of a host processor, a driver for a graphics processor (GPU) that is to perform the graphics processing operation, and a graphics processor (GPU).

As will be appreciated from the above, the technology described herein is accordingly in an embodiment implemented and executed in a graphics processing system that includes a host processor (CPU) and a graphics processor (GPU), with the host processor executing a driver for the graphics processor, with the GPU, e.g., using the data representing the subsets of primitives to determine a set or sets of subsets of primitives to be processed (and potentially also generating the data structure(s) representing the subsets of primitives), and in an embodiment then processing the so-identified subsets of primitives in the desired manner.

The graphics processor and/or graphics processing system may also comprise, and/or be in communication with, one or more memories and/or memory devices that store the data described herein, and/or the output data generated by the graphics processing unit, and/or store software for performing the processes described herein. The graphics processing unit may also be in communication with the host microprocessor, and/or with a display for displaying images based on the data generated by the graphics processing unit.

The technology described herein can be used in any suitable and desired graphics processing system.

The technology described herein is particularly suitable for use with tiled renderers (graphics processing systems). It is particularly suitable for tiled deferred renderers, but could also be used with other tiled methods, such as "tiled forward rendering", if desired. Thus, in an embodiment, the graphics processing system is a tiled renderer, in an embodiment a tiled deferred renderer.

The graphics processing system is in an embodiment able to be operated both in a conventional graphics context, e.g. to perform conventional graphics rendering processes, and also in a compute context so as to be able to perform GPGPU processing.

The graphics processor may contain any suitable and desired processing stages (elements) that a graphics processor and processing pipeline may contain such as a rasteriser, a renderer, an early depth (or an early depth and stencil) tester, a late depth (or depth and stencil) tester, a blender, a tile buffer or buffers, a write-out unit, etc.

The graphics processing system in an embodiment includes at least local memory, such as (on-chip) buffer or buffers, and/or register(s), that can be used to store the data required, e.g. for the light source visibility parameter determination process and the determined light source visibility parameters. Where present, the tile buffers can be used for this purpose, if desired.

The technology described herein can be used for all forms of output that a graphics processing system may be used to generate, such as frames for display, render-to-texture outputs, etc.

In an embodiment, the various functions of the technology described herein are carried out on a single graphics processing platform that generates and outputs the rendered fragment data that is, e.g., written to the frame buffer for the display device.

Thus the graphics processing system should (and in an embodiment does) produce some useful output data, e.g. graphics processing output data for use in (subsequent) graphics processing operations etc. In an embodiment, the generated output data is used to provide an image for display, e.g. is provided to a display for display.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the graphics processing system and pipeline can otherwise include any one or more or all of the usual functional units, etc., that graphics processing pipelines include.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

It will also be appreciated by those skilled in the art that all of the described embodiments and embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on data processor, a computer program element comprising computer software code portions for performing the methods herein described when the program element is run on data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Embodiments of the technology described herein will now be described in the context of the processing of computer graphics for display.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

FIG. 1 shows a typical computer graphics processing system, comprising a host processor (CPU) 1, a graphics processing unit (GPU) 3, and a memory 5 for storing data required by and/or generated by the host processor 1 and GPU 3.

When an application 2 that is executing on the host processor 1 requires graphics processing from the GPU 3, such as a frame to be displayed, the application 2 will send appropriate commands and data to a driver 4 for the GPU 3 that is running on the host processor 1.

The driver 4 will then send appropriate commands to the graphics processor 3 to cause it to generate the graphics output required by the application 2.

The commands and data provided to the driver 4 will (typically) indicate a list of primitives to be rendered for the output frame to be generated by the graphics processor 3, together with an associated vertex array that includes the vertices to be used for the primitives for the output frame.

The output frame to be generated by the graphics processor 3 may typically be a frame intended for display on a display device, such as a screen or printer, but may also, for example, comprise intermediate data intended for use in later rendering passes (also known as a "render to texture" output), etc.

The primitives to be processed for the output frame are usually listed in the order that they are to be rendered. Each primitive will have associated with it a set of vertices which are referred to by their index in the associated vertex array.

To further facilitate the rendering operation, the primitives to be processed for an output frame will usually be organised into distinct draw calls. For each draw call there will be a set of primitives to be processed, with each primitive in the set having associated with it a set of vertices which are referred to by their indices in the associated vertex array. The draw calls for an output frame are processed in turn to generate the output frame.

Figure 2:
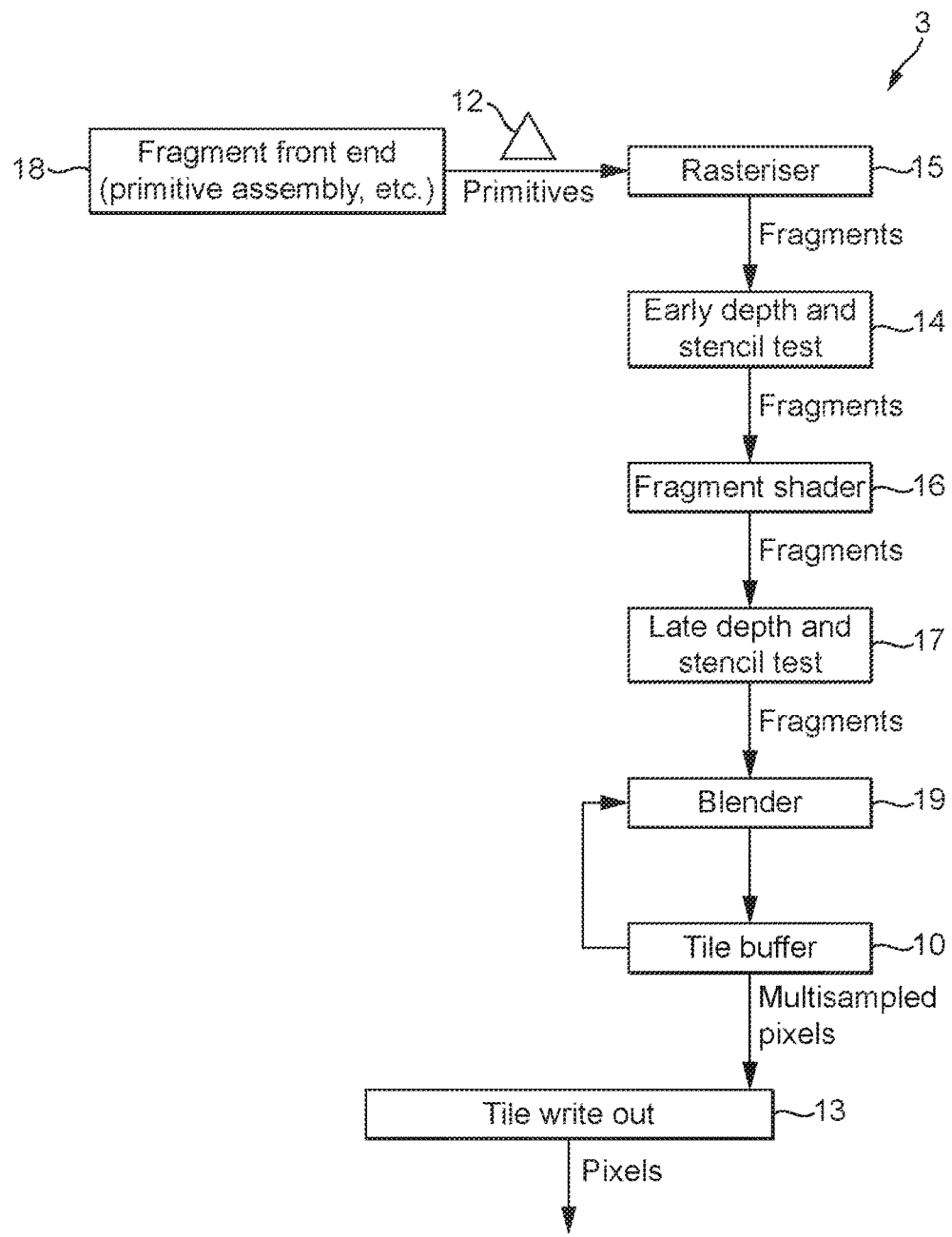
FIG. 2 shows schematically an exemplary graphics processing pipeline.

FIG. 2 shows schematically the graphics processor (graphics processing pipeline) 3 in more detail. In the present embodiment the graphics processing pipeline 3 is a tiled deferred renderer with a fully programmable GPGPU context, for example a renderer which executes partly via Direct Compute, OpenCL, CUDA, etc.

As the graphics processing pipeline 3 shown in FIG. 2 is a tile-based renderer, it will produce tiles of a render output data array, such as an output frame to be generated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential. Each tile corresponds to a respective set of screen space sampling positions.)

Figure 3:
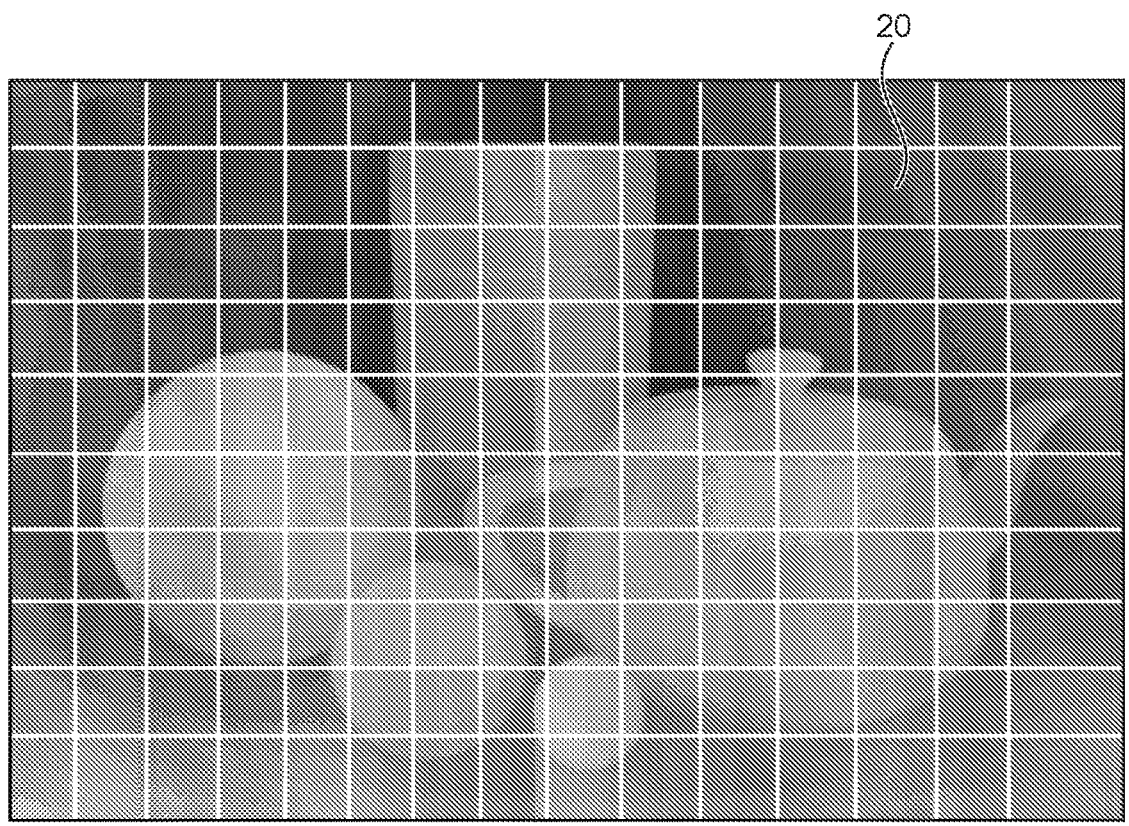
FIG. 3 shows an exemplary image to be displayed that has been divided into tiles for processing purposes.

FIG. 3 shows an exemplary image to be displayed that has been divided into respective tiles 20.

The render output data array may typically be an output frame intended for display on a display device, such as a screen or printer, but may also, for example, comprise intermediate data intended for use in later rendering passes (also known as a "render to texture" output), etc.

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate processing circuitry and/or processing logic, etc., for performing the necessary operation and functions.

FIG. 2 shows schematically the pipeline stages after the graphics primitives (polygons) 12 for input to the rasterisation process have been generated. Thus, at this point the graphics data (the vertex data) has undergone fragment frontend operations 18, such as transformation and lighting operations (not shown), and a primitive set-up stage (not shown) to set-up the primitives to be rendered, in response to the commands and vertex data provided to the graphics processor.

As shown in FIG. 2, this part of the graphics processing pipeline 3 includes a number of stages, including a rasterisation stage 15, an early Z (depth) and stencil test stage 14, a renderer in the form of a fragment shading stage 16, a late Z (depth) and stencil test stage 17, a blending stage 19, a tile buffer 10 and a downsampling and writeout (multisample resolve) stage 13.

The rasterisation stage 15 of the graphics processing pipeline 3 operates to rasterise the primitives making up the render output (e.g. the image to be displayed) into individual graphics fragments for processing. To do this, the rasteriser 15 receives graphics primitives 12 for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 14 performs a Z (depth) test on fragments it receives from the rasteriser 15, to see if any fragments can be discarded (culled) at this stage. To do this, it compares the depth values of (associated with) fragments issuing from the rasteriser 15 with the depth values of fragments that have already been rendered (these depth values are stored in a depth (Z) buffer that is part of the tile buffer 10) to determine whether the new fragments will be occluded by fragments that have already been rendered (or not). At the same time, an early stencil test is carried out.

Fragments that pass the fragment early Z and stencil test stage 14 are then sent to the fragment shading stage 16. The fragment shading stage 16 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 17, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by comparing the depth values of (associated with) fragments issuing from the fragment shading stage 16 with the depth values of fragments that have already been rendered (as stored in the depth buffer). This late fragment depth and stencil test stage 17 also carries out any necessary "late" alpha and/or stencil tests on the fragments.

The fragments that pass the late fragment test stage 17 are then subjected to, if required, any necessary blending operations with fragments already stored in the tile buffer 10 in the blender 19. Any other remaining operations necessary on the fragments, such as dither, etc. (not shown) are also carried out at this stage.

Finally, the (blended) output fragment data (values) are written to the tile buffer 10 from where they can, for example, be output to a frame buffer for display. The depth value for an output fragment is also written appropriately to a Z-buffer within the tile buffer 10. (The tile buffer stores colour and depth buffers that store appropriate colour, etc., values or a Z-value, respectively, for each sampling position that the buffers represent (in essence for each sampling position of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

In the present embodiment, the tile buffer stores its fragment data as 32×32 arrays (i.e. corresponding to a 32×32 array of sample positions in the output to be generated, e.g., in the image to be displayed). Each 32×32 data position array in the tile buffer can accordingly correspond to (and will "natively" support) a 16×16 pixel "tile" of, e.g., the frame to be displayed, at 4× anti-aliasing (i.e. when taking 4 samples per pixel).

The tile buffer is provided as part of RAM that is located on (local to) the graphics processing pipeline (chip).

The data from the tile buffer 10 is input to a downsampling (multisample resolve) write out unit 13, and thence output (written back) to an external memory output buffer, such as a frame buffer of a display device (not shown). (The display device could comprise, e.g., a display comprising an array of pixels, such as a computer monitor or a printer.)

In the present embodiments, the downsampling and writeout unit 13 downsamples (in either a fixed or variable fashion) the fragment data stored in the tile buffer 10 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 that allow the effect of shadows in an image being rendered to be simulated in accordance with embodiments of the technology described herein will now be described.

The present embodiments will be described, for ease of explanation, with reference to processing a frame composed of solid geometry and a single, rectangular, area light source. However, other arrangements would, of course, be possible.

The present embodiments operate to simulate the effect of shadows in an image being rendered by determining, for each tile of the output frame, a set of geometry that could cast a shadow from a light source on objects in the tile, and then using that determined set of "shadow-casting" geometry to derive a light source visibility parameter for each sampling position of the tile in question. The light source visibility parameters for the sampling positions for the tile are then used when rendering (shading) the output image for the tile to modulate the colour values for the sampling positions so as to simulate the effect of the shadows at the sampling positions.

Figure 4:
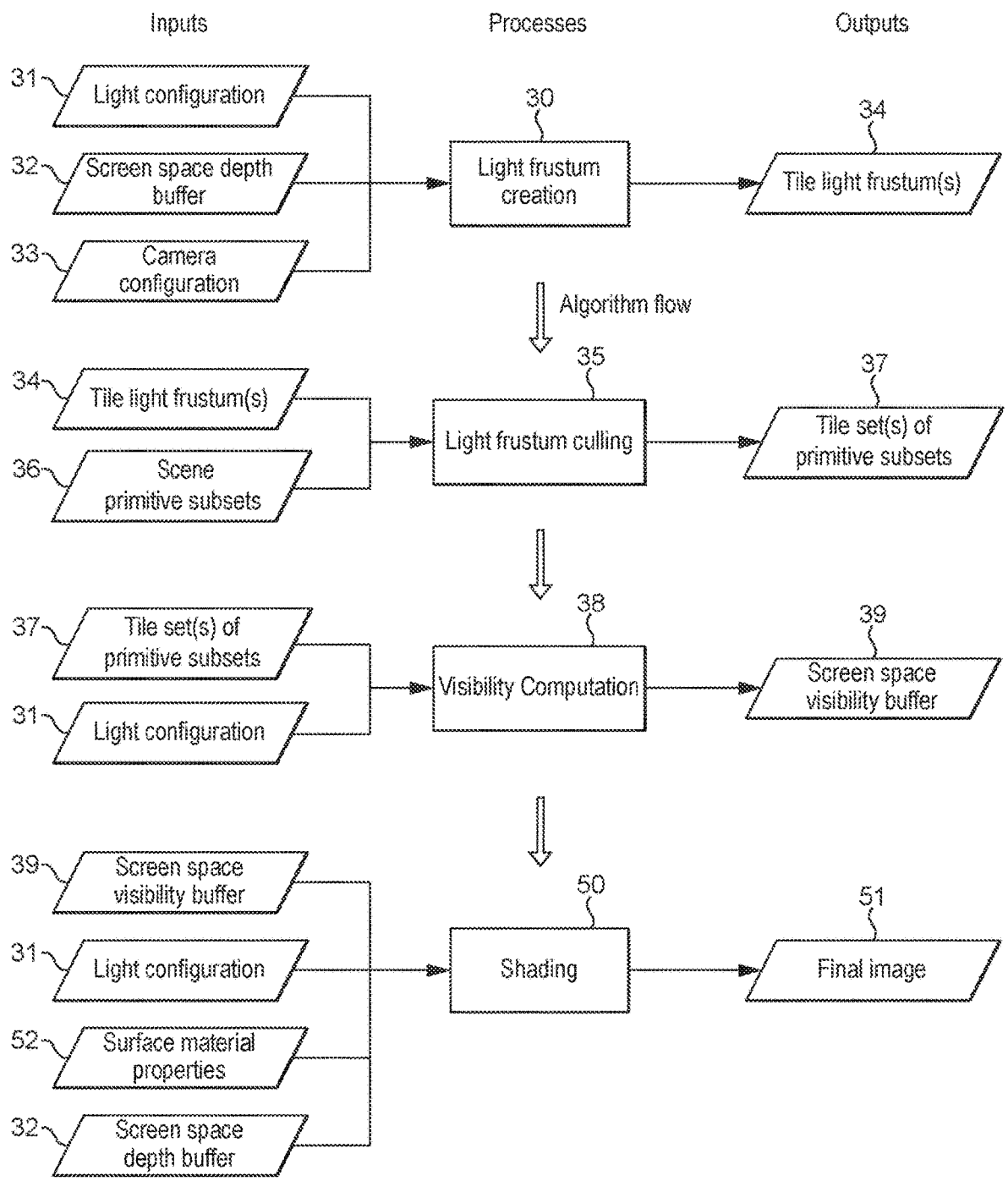
FIG. 4 shows schematically the processing of a tile being rendered in an embodiment of the technology described herein.

FIG. 4 shows schematically this operation for a given tile in more detail.

As shown in FIG. 4, the process starts by creating bounding frustums for the light or for each light that could shine in the tile in question (step 30). This operation takes as its inputs information about the configuration of the light or lights for the frame being rendered, a screen space depth buffer 32 that has previously been derived from the geometry for the frame, and information indicating the camera configuration 33 for the frame, and produces as its output, one or more light source bounding frustums 34 for the tile.

In the present embodiment, one bounding frustum is produced for a tile for each light source, although other arrangements, such as producing plural bounding frustums for a given light source, would be possible, if desired. It may, for example, be desirable to produce plural bounding frustums for a given light source if, for example, there are large depth discontinuities in the frame, and/or when the screen space samples for the frame can be split into disjoint groups which are themselves local, but far apart from each other.

Figure 5:
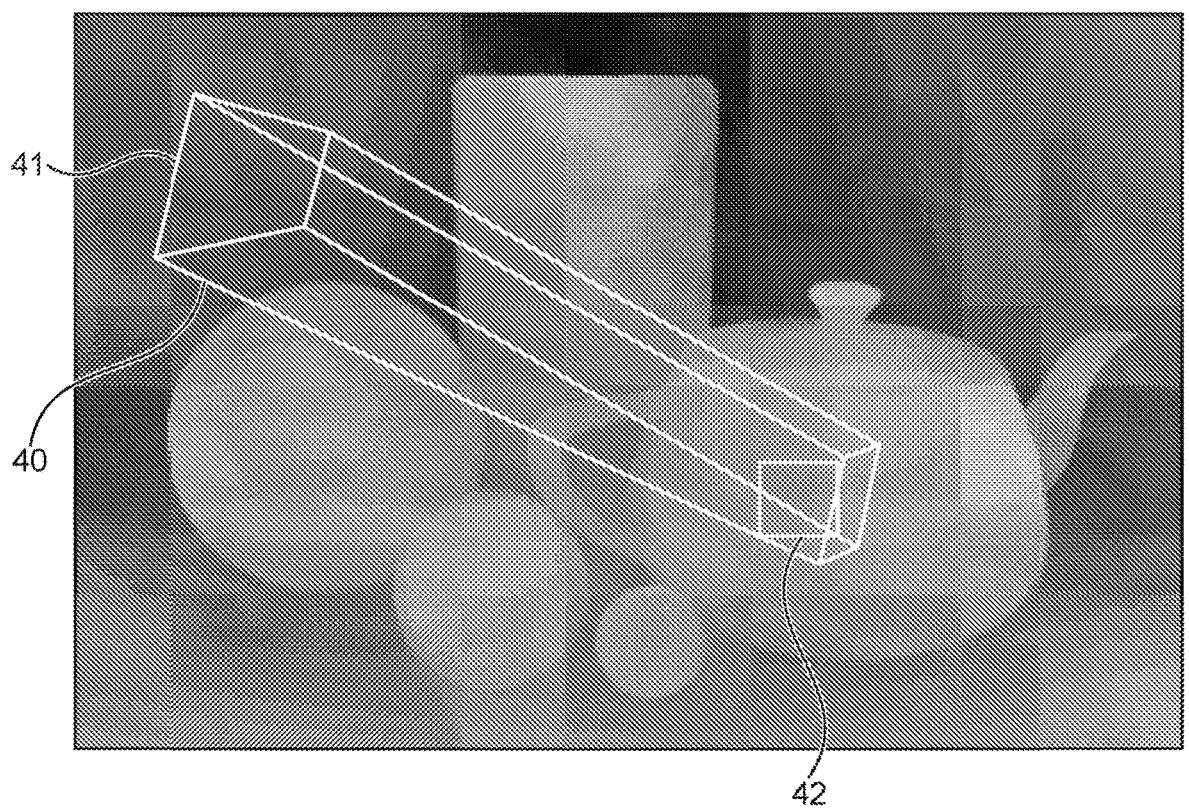
FIG. 5 shows an exemplary light source bounding frustum for a tile.

To determine a light source bounding frustum for a tile, the minimum and maximum depth values for the tile are determined from using the data in the screen space depth buffer 32. This is then used to construct a bounding frustum which contains all of the visible geometry in the tile and the light source itself. FIG. 5 illustrates this and shows an exemplary light source bounding frustum 40 for an area light 41 for a given tile 42 of the frame.

Once all the light source bounding frustums have been derived for the tile being processed, those light source bounding frustums are then used, as shown in FIG. 4, to determine a set of geometry for the tile that could cast a shadow in the tile (step 35).

In the present embodiment the set of geometry for a tile that could cast a shadow in the tile is determined as a set of subsets of primitives of the set of primitives that is to be processed for the frame (or draw call) in question. In effect, the set of primitives to be processed for the frame or draw call in question is divided into plural subsets of primitives, and it is then determined which of those subsets of primitives could cast a shadow in a tile (and in each tile). The process of dividing the set of primitives into subsets of primitives and the data that is prepared and stored for the respective subsets of primitives that is then used in the operation of the present embodiment will be described in more detail below.

To determine a set of subsets of primitives that could cast a shadow in a tile, as shown in FIG. 4, the scene (frame) geometry 36 in the form of subsets of primitives is culled against the light source bounding frustum(s) 34 for the tile in a light frustum culling process 35. This process operates to construct a list of possible occluding subsets of primitives which could affect the shading of the tile (cast a shadow in the tile), by determining, for each subset of primitives, whether or not it intersects a light source bounding frustum for the tile. (This is on the basis that any occluding subset of primitives which could affect the shaded value of geometry in the tile must intersect the light source bounding frustum for the tile.)

The output of this process is accordingly a list 37 of subsets of primitives for the tile which could cast a shadow in the tile.

The light source bounding frustum culling operation 35 can be carried out as desired. For example, it would be possible to iteratively test each subset of primitives in turn against each light source bounding frustum. However, in the present embodiments, this operation is accelerated by using a hierarchy for the tile light source bounding frustums and a separate hierarchy for the subsets of primitives. In this case, high level, bounding volume, representations of the subsets of primitives are first tested against light source bounding frustums for sets of plural tiles, and then any high level bounding volume representations of subsets of primitives that pass this first stage are intersection tested against the individual tile light source bounding frustums. Finally, individual subsets of primitives are tested against the individual tile light source bounding frustums.

Once the lists (sets) of subsets of primitives 37 that could affect the shading of the tile have been determined, those sets of subsets of primitives are then used to determine a light source visibility parameter for each sampling position in the tile in question in a visibility computation process 38, as shown in FIG. 4. This visibility computation operation 38 operates to determine a light source visibility parameter for each sampling position of the tile (which light source visibility parameter is then used to modulate the light source to simulate the effect of the shadows at the sampling position in question).

To do this, an array of sampling positions (representing the location of the light source being considered) is determined, and it is then determined for each tile screen space sampling position, whether rays cast between the tile sampling position and each light source sampling position would intersect an occluding subset of primitives or not.

Figure 6:
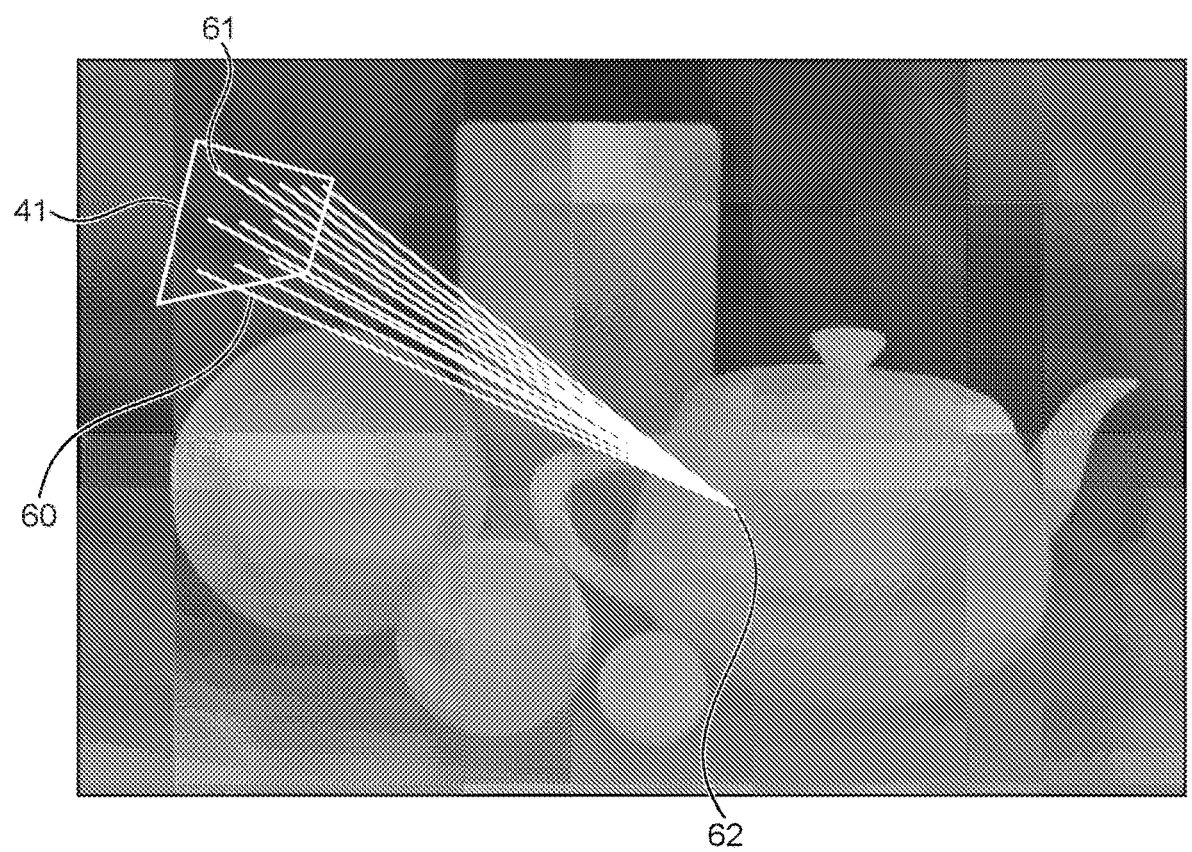
FIGS. 6, 7, and 8 illustrate the determination of occluded light source sampling positions in an embodiment of the technology described herein.
Figure 7:
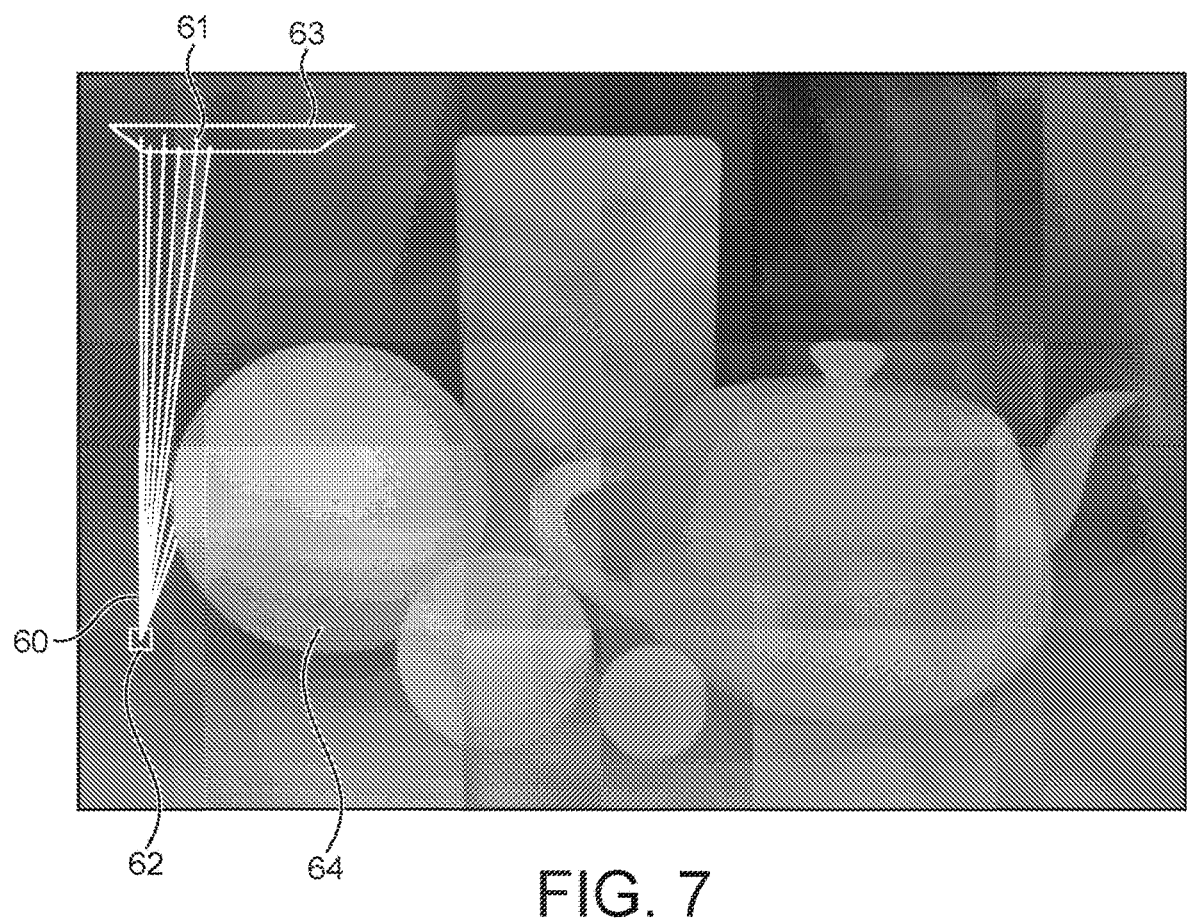
Figure 8:
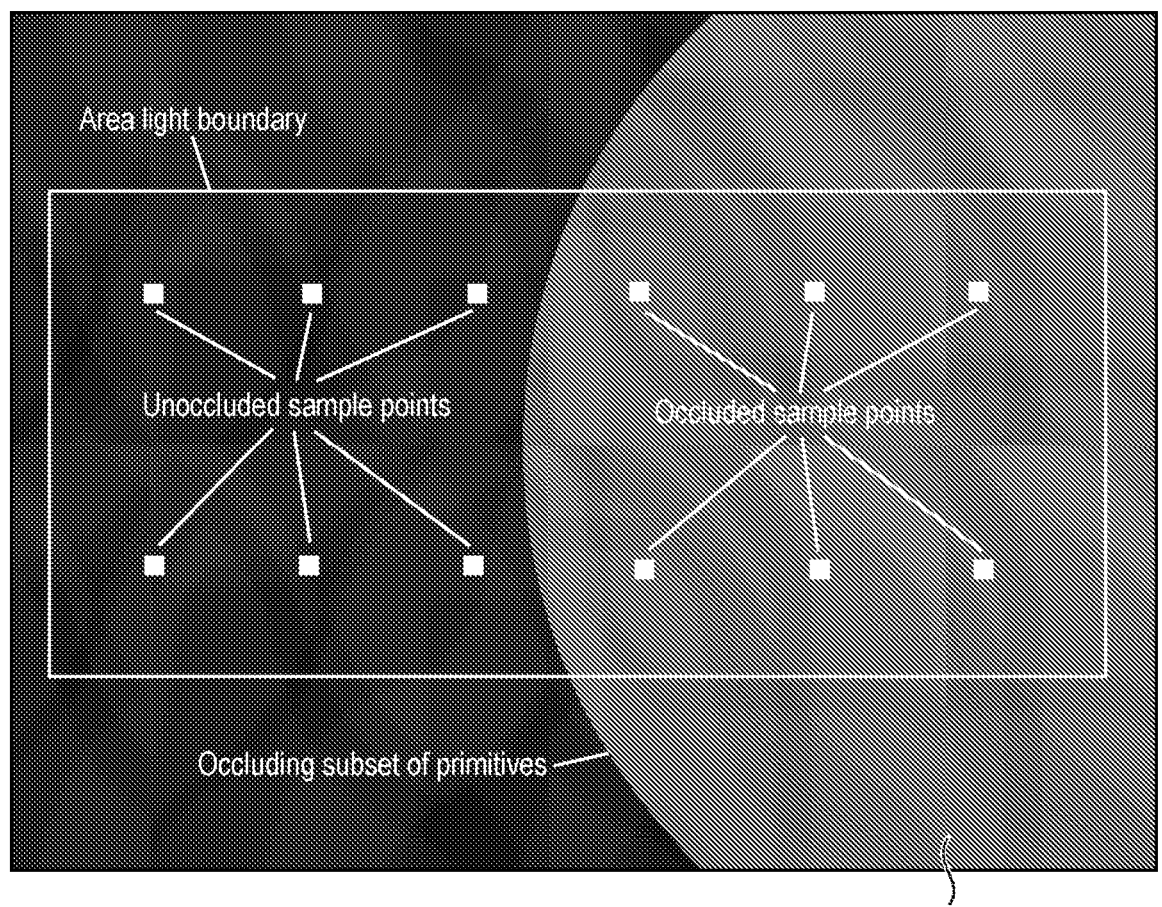

FIGS. 6, 7 and 8 illustrate this operation. FIG. 6 shows exemplary rays 60 cast from sampling positions 61 for an area light 41 to a tile sampling position 62. In this example shown in FIG. 6, it is assumed that none of the rays from the tile sampling position 62 to the light source sampling position 61 intersect an occluding subset of primitives.

FIG. 7 shows an alternative situation in which some of the rays 60 cast from the tile sampling position 62 being considered to sampling positions 61 representing an area light 63 will be intersected by an occluding subset of primitives 64 (representing a sphere for example).

As shown in FIG. 8, in this case, some of the sampling points representing the area light 63 will be occluded from the perspective of the tile sampling position 62 by the occluding subset of primitives 64 and others of those sampling points will not be occluded.

In the present embodiments, the determination of whether rays cast between a tile sampling position and each light source sampling position would intersect an occluding subset of primitives is carried out as a rasterisation operation. To do this, a single execution thread is used for each tile sampling position, and operates to rasterise the subsets of primitives as indicated by the determined sets of subsets of primitives 37 for the tile onto a render target that corresponds to the array of sampling positions that represent the light source. As for each sampling position in the tile the same set of subsets of primitives will be considered, the memory access and thread execution pattern for this operation can be extremely coherent.

In the present embodiment, this rasterisation operation (the visibility computation process 38) operates to identify for each light source sampling position whether it is occluded from the tile sampling position in question by any subsets of primitives or not. Thus the render target for the rasterisation process is an array having a single bit for each light source sampling position, with the bit being set by the rasterisation operation if it is determined that the light source sampling position in question will be visible from the tile sampling position being considered.

In this arrangement, where, for example, the light source is represented by, e.g., a few hundred sampling positions, the "light source visibility" render target will only require a few hundreds of bits (one per sampling position), and so can, for example, fit in registers (i.e. does not need to be stored in main memory).

Once all the relevant subsets of primitives have been considered by the rasterisation process, the number of set bits in the rendered target is then counted (i.e. the number of visible light source sampling positions for the tile sampling position in question is counted), and used to determine a light source visibility parameter value for the tile (screen space) sampling position in question. In the present embodiment, the light source visibility parameter value for the tile (screen space) sampling position is determined as the ratio of visible (non-occluded) light source sampling positions for the tile sampling position in question to the total number of light source sampling positions for the light source in question. Other arrangements would of course be possible.

This value is then stored for the tile sampling position in question in a screen space visibility buffer 39 that will store the determined light source visibility parameters for each sampling position of the tile. The process is then repeated for the next sampling position in the tile, and so on, until a light source visibility parameter has been determined and stored in the screen space visibility buffer 39 for each sampling position of the tile.

The screen space visibility buffer 39 for the tile is stored locally to the graphics processing pipeline, e.g. in registers (and does not need to be and is not written out to main memory).

In these arrangements, the light source visibility parameter for a tile sampling position could simply be the proportion (ratio) of the number of light source sampling positions that are visible at the sampling position in question, or, for example, the proportion of visible light source sampling positions could be scaled to a number that is within a predefined range, such as between 0 and 1, which scaled value is then used as the light source visibility parameter value for the tile sampling position in question.

The array of sampling positions that represent the location of the light source being considered in these embodiments can be selected as desired. For example, a regular grid of sampling positions could be used, and a rotated grid of sampling positions could be used to try to reduce aliasing.

Once the screen space visibility buffer 39 for a tile has been determined, the values in the screen space visibility buffer can then be used when shading the geometry in the tile to produce the rendered output image for the tile, as shown in FIG. 4 (step 50).

As shown in FIG. 4, the shading operation 50 will determine an output set of colour data for each tile sampling position that is then used to display the output image 51. This shading operation will, inter alia, take into account the intensity and colour of the light source, the colour and transparency of the surface that the light is falling on the depth of the surface that the light is falling on, and, in accordance with the present embodiments, the determined light source visibility parameters, to determine the output colour for each tile sampling position.

To do this, the shading operation 50 uses, inter alia, the light configuration 31 for the frame, the relevant surface material properties 52 at the sampling position in question, the depth 32 at the sampling position in question, and the light source visibility parameter in the screen space visibility buffer 39 for the tile sampling position being considered. The light source visibility parameter from the screen space visibility buffer 39 is used in the shading operation 50 in the present embodiments to modulate (attenuate) the indicated illumination value for the light source in question at the (and at each) tile sampling position being considered, by multiplying the illumination value for the light source by the light source visibility parameter for the tile sampling position being considered. This will then give a good, visually pleasing approximation to the correct shadowing result. Other arrangements would, of course, be possible.

In the present embodiments, each of the processing stages shown in FIG. 3 (thus the light frustum creation 30, the light frustum culling 35, the visibility computation 38 and the shading 50) are performed by the graphics processor 3 performing GPGPU processing via a compute context.

The above describes the operation for a single output tile for a single light source. The operation can be extended in a corresponding manner to arbitrarily many light sources for a tile.

It will also be appreciated that this operation should be repeated for each tile of the frame being rendered for output (at least where there could be shadow-casting geometry) (and for each frame of a sequence of frames to be rendered).

As discussed above, in the present embodiments the geometry for a frame to be processed that is tested to determine if it will occlude a light source for a given frame region (and that is then tested against the respective light source representing sampling positions) is represented for this purpose as respective subsets of primitives of the set of primitives that is to be processed). The process for dividing a set of primitives to be processed into subsets of primitives that is used in the present embodiments will now be described with reference to FIGS. 9, 10, and 11.

In the present embodiments, it is assumed that the primitives in the set of primitives to be processed are in the form of triangles. Thus this operation of the present embodiments will be described with reference to primitives in the form of triangles. However, this is not essential, and primitives having other forms could be used if desired (with the process then operating in a corresponding manner for those primitives).

Figure 9:
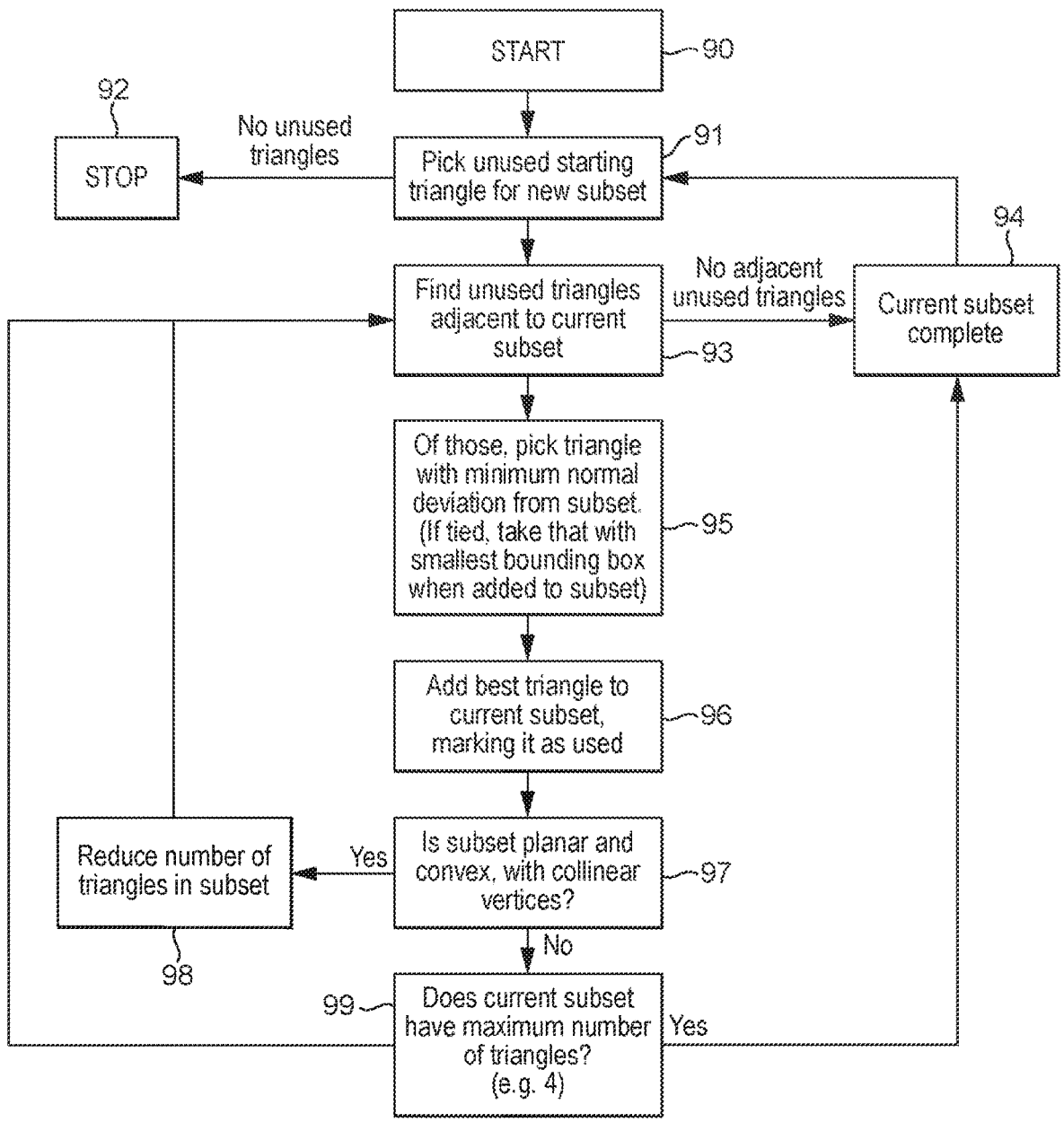
FIG. 9 shows schematically the subdivision of a set of primitives into subsets of primitives in an embodiment of the technology described herein.

As shown in FIG. 9, the processing starts (step 90) by selecting an unused starting triangle of the set of primitives being considered (i.e. a primitive in the set of primitives being processed that has not yet been allocated to a subset) to act as a starting triangle for a new subset of primitives (step 91).

The set of primitives that is being considered in this regard may, e.g., be the set of primitives to be processed for the desired graphics processing output (e.g. output frame) as a whole, or it may be a set of primitives defined for a smaller subdivision of the graphics processing output, such as a set of primitives for a given draw call.

If at step 91 it is determined that there are no remaining unused (unallocated) primitives in the subset of primitives (i.e. that all the primitives of the subset of primitives being considered have been allocated to a respective subset of primitives), then the process of subdividing the set of primitives into subsets of primitives is complete (step 92).

On the other hand, if at step 91, there is an unused triangle (primitive) in the set of primitives, then that unused triangle is selected as a starting triangle for a new subset of primitives. It is then determined whether there are any unused triangles (i.e. any primitives in the set of primitives that have not yet been allocated to a subset of primitives) that are adjacent to and contiguous with the current subset of primitives (step 93).

If at this stage it is determined that there are no adjacent, contiguous, unused triangles in the set of primitives, then the current subset of primitives is considered to be complete (step 94), and the process returns to the selection of a new, unused starting primitive for a new subset of primitives at step 91.

On the other hand, if there are unused, contiguous triangles adjacent to the subset of primitives currently being considered, then one of those adjacent, contiguous triangles is selected as a triangle (primitive) to add to the current subset of primitives (step 95).

As shown in FIG. 9, if there is more than one unused, adjacent, contiguous triangle to the current subset, then firstly the candidate adjacent contiguous triangle to add to the subset of primitives that has the minimum normal deviation from the subset of primitives (in its current form) is selected as the triangle to add to the subset of primitives. If the candidate adjacent, contiguous triangles cannot be distinguished on the basis of their normal deviation from the subset of primitives, then the candidate adjacent, contiguous triangle that adds the smallest bounding box when added to the current subset of primitives is selected as the primitive to add to the subset of primitives.

The normal directions of the triangles and subset of primitives, and the bounding volumes for the subset of primitives and the candidate primitives can be determined for this purpose in any suitable and desired manner, for example based on the vertices for the primitives (triangles).

The selected candidate unused adjacent and contiguous triangle is then added to the current subset of primitives (and marked as being used (allocated to a subset of primitives)) (step 96).

Once a candidate triangle has been added to a subset of primitives at step 96, it is then determined whether the subset of primitives with that new triangle is planar and convex, with co-linear vertices (step 97). If so, the number of triangles in the subset is reduced, by merging the planar triangles with co-linear vertices to form a single primitive to remove their shared edge (step 98).

The process then returns to step 93 to determine if there are any further unused, adjacent and contiguous triangles that could be added to the current subset of primitives.

If at step 97 it is determined that the subset is not planar and convex with co-linear vertices, then triangles in the subset of primitives cannot be merged, so the process proceeds then to determine whether the current set of primitives has reached a selected maximum number of triangles or not (which in the present embodiment is set to be four triangles, although other arrangements would, of course, be possible) (step 99).

If it is determined that the current subset of primitives has not yet reached the maximum number of triangles permitted for a subset of primitives, then the process returns to step 93 to determine if there are any further unused, adjacent and contiguous triangles that could be added to the current subset of primitives.

On the other hand, if it is determined that the current subset of primitives has reached the maximum number of triangles permitted for a subset of primitives at step 99, then the current subset of primitives is considered to be complete (step 94) and the process returns to step 91 to determine a new starting triangle for a new subset of primitives (if any).

This process is repeated until all the primitives (triangles) in the set of primitives being considered have been allocated to a subset of primitives.

Figure 10:
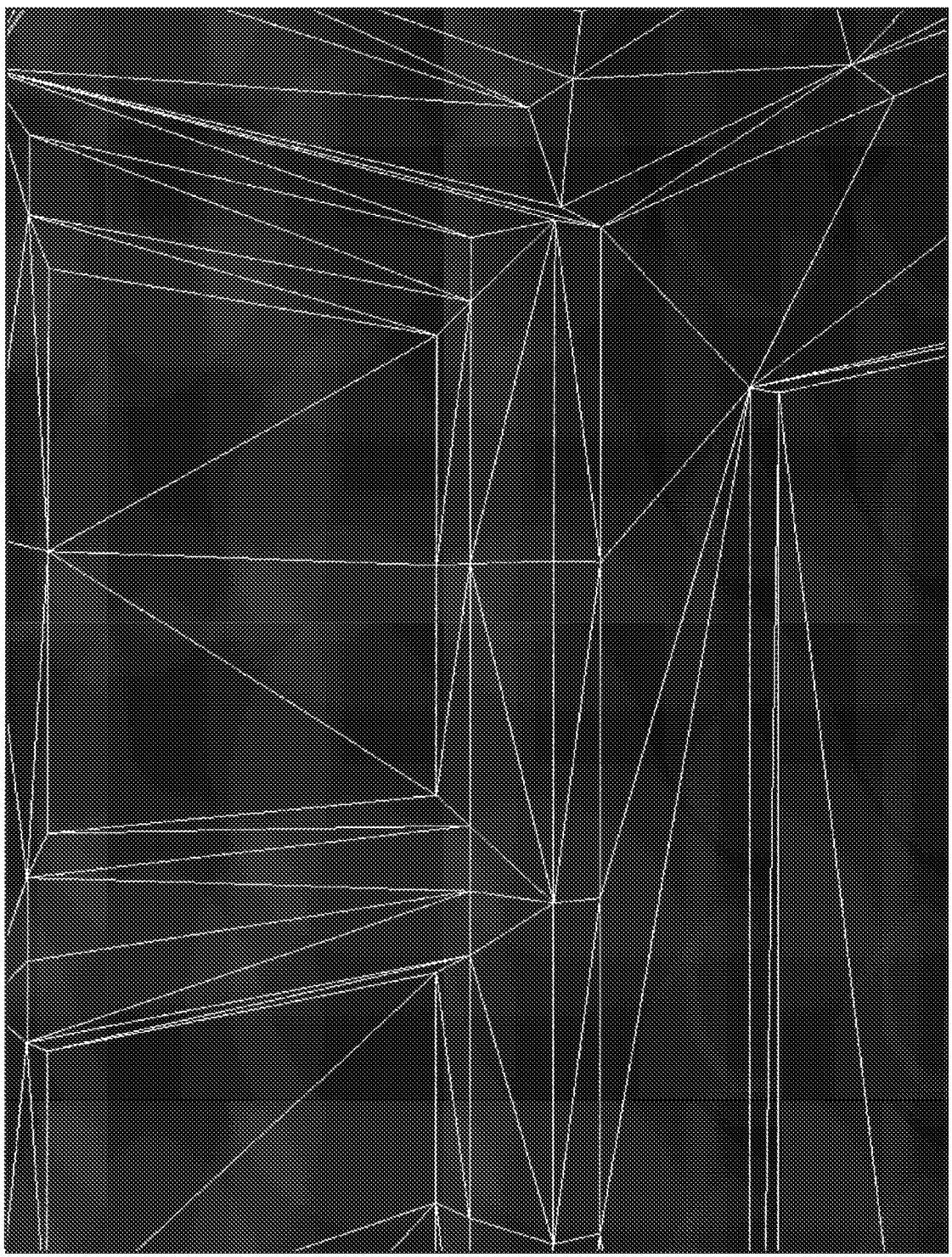
FIGS. 10 and 11 illustrate the subdivision of a set of primitives into subsets of primitives.
Figure 11:
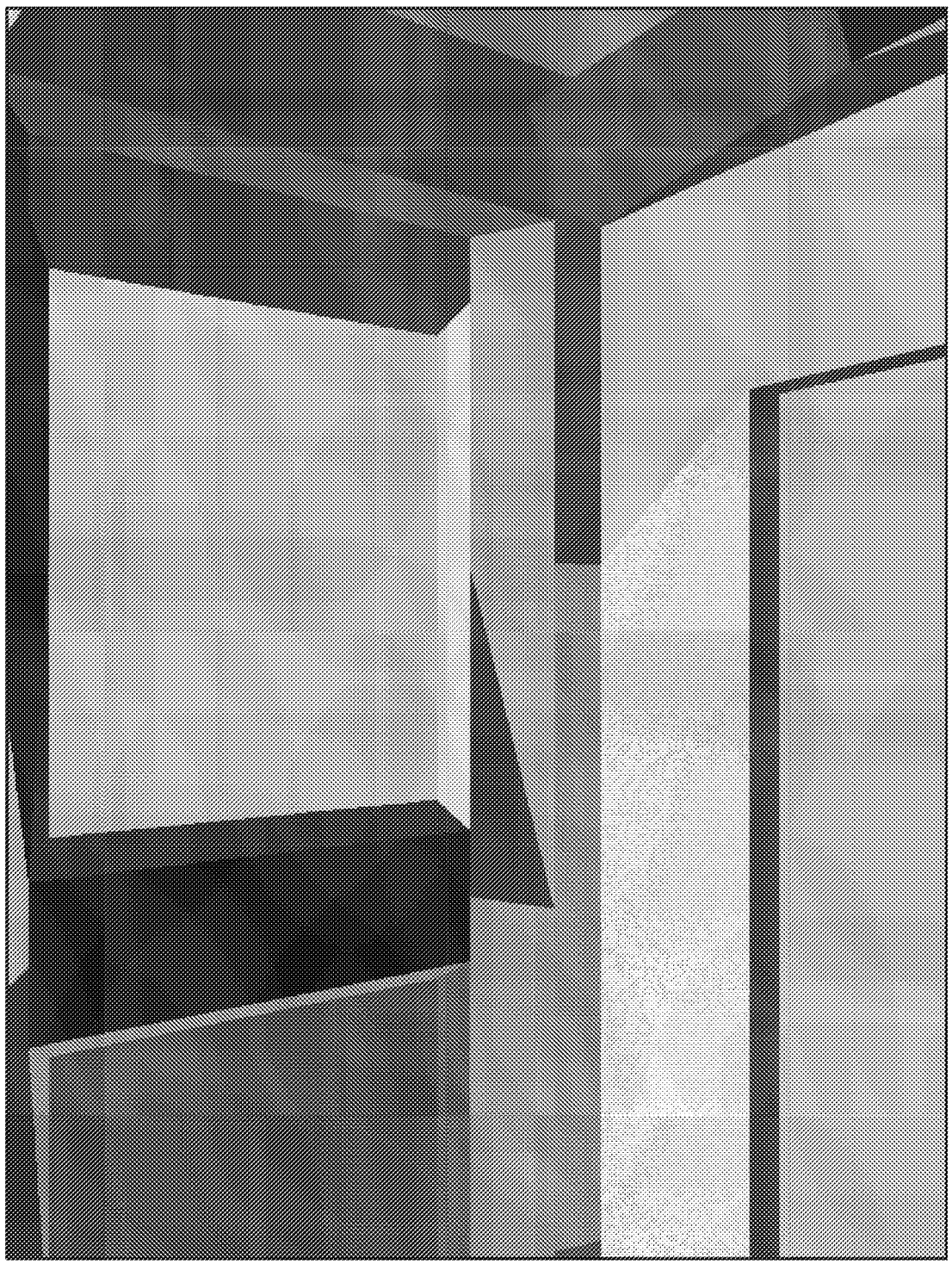

FIGS. 10 and 11 illustrate this subdivision of a set of primitives into subsets of primitives.

FIG. 10 shows an exemplary set of primitives to be subdivided into subsets of primitives in the manner of the present embodiment. FIG. 11 shows schematically the resulting subsets of primitives that are formed from the set of primitives shown in FIG. 10. Each different coloured region in FIG. 11 is a respective subset of primitives formed from the set of primitives shown in FIG. 10 in accordance with the process for dividing a set of primitives into subsets of primitives shown in FIG. 9.

Other arrangements for subdividing a set of primitives into subsets of primitives would, of course, be possible.

As well as subdividing the set of primitives to be processed into respective subsets of primitives, the present embodiments also store for each subset of primitives that the set of primitives has been divided into, data representative of the primitives of the subset of primitives, and data indicating the volume of space that the subset of primitives falls within.

In the present embodiments, this data is stored in a fixed sized data structure for each subset of primitives, as that facilitates, e.g., accessing that data in memory. Where the data for a given subset of primitives does not completely fill the fixed size data structure (e.g. because the subset contains less than the maximum permitted number of primitives), the data structure is in an embodiment padded with dummy values or includes data values to indicate this.

In the present embodiments, the data representative of the primitives in a subset of primitives that is stored for a subset of primitives comprises a set of vertex indices that indicate a vertex index for each unique vertex position of the subset of indices. To facilitate this, a modified set (list) of vertices that includes only unique vertex positions is generated from the set of vertices for the set of primitives in question. The index data that is then stored for each subset of primitives indicates the vertices (the vertex positions) in that modified set (list) of vertices. The vertex indices are stored for a subset of primitives in the order that the vertices are connected in, to facilitate the later determination of the topology of the subset of primitives in question.

As well as a set of position indices indicating vertex positions for a subset of primitives, in the present embodiments additional data indicative of the topology of the subset of primitives, which together with the vertex position indices for the subset of primitives can be used to determine the topology of the subset of primitives, is stored. In the present embodiments, this topology information comprises an indication of a number of primitives in the subset of primitives, an indication of the number of edges of the first primitive in the subset of primitives, an indication of the number of edges of the second primitive in the subset of primitives (if present) (in the present embodiment, the second primitive of a subset of primitives (if any) is always configured as being attached to a predefined edge of the first primitive of the subset), an indication of the edge that the third primitive in the subset of primitives (if present) attaches to, and an indication of the two vertices that the fourth primitive in the subset of primitives (if present) attaches to.

The Applicants have recognised in this regard, that by capping the number of primitives that can be present in a subset of primitives to, e.g., four, that constrains the potential topologies that a subset of primitives can take, and thereby facilitates indicating the topology of the primitives in a subset of primitives in a relatively efficient manner and using relatively little data capacity.

Figure 12:
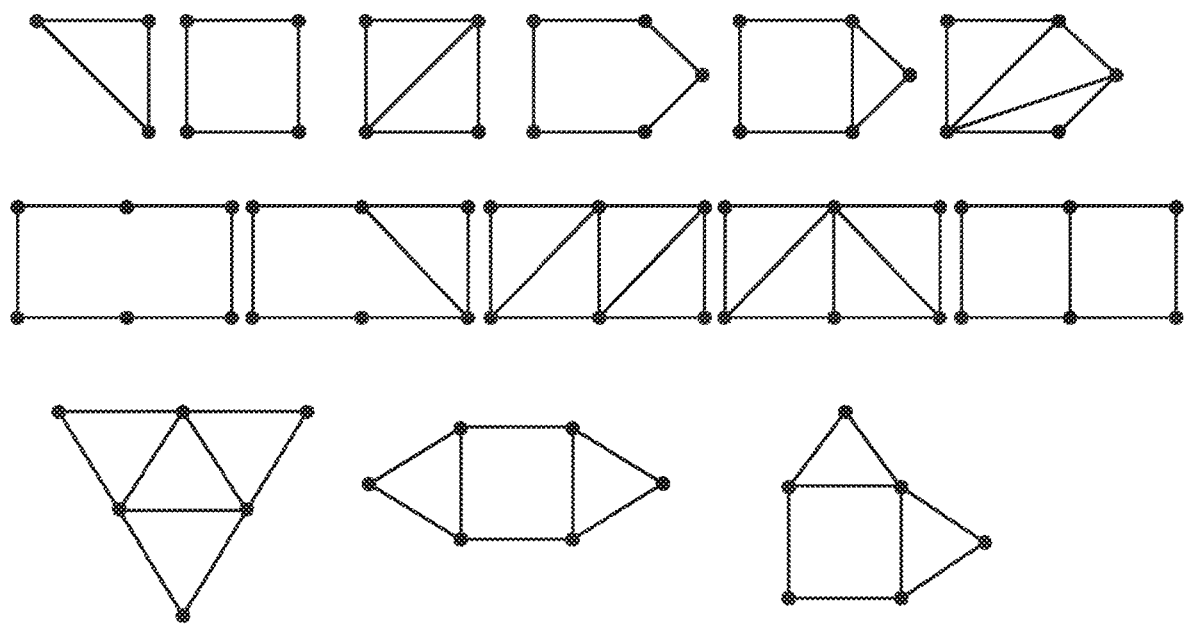
FIG. 12 shows the possible topologies for a subset of primitives in an embodiment of the technology described herein.

FIG. 12 shows the potential topologies that a subset of primitives can have where each subset is able to contain no more than four triangles (as in the present embodiments), and which can accordingly be indicated by the topology information that is used in the present embodiments.

The data that is stored for a subset of primitives that represents the volume of space that the subset of primitives falls within (occupies) defines (indicates), in the present embodiments, an axis aligned bounding volume for the subset of primitives.

This vertex index, topology and bounding volume information is generated and stored for each subset that a set of primitives is divided into.

In the present embodiments, the data for the subsets of primitives is stored as a bounding volume hierarchy, and in particular as a tree structure or structures representing the set of primitives, with each leaf node in the tree corresponding to a given subset of primitives (and having stored for it the data for that subset of primitives). For each higher node in the tree, data representing a combined bounding volume of all its lower nodes is stored.

In the present embodiments, the tree structure that is formed is structured so as to have a very high (and constant) branching factor, and not many levels. In an embodiment tree structures having a 128 leaf nodes and only a few levels, e.g. 2 or 3 levels, above those 128 leaf nodes are used. Where a given set of primitives is divided into more than 128 subsets of primitives, then additional tree structures are used as required. In this case, the "trees" (groups of 128 subsets of primitives) are in an embodiment organised such that the combination of the subsets of primitives of each tree is as small in volume as possible.

Other arrangements would, of course, be possible.

Figure 13:
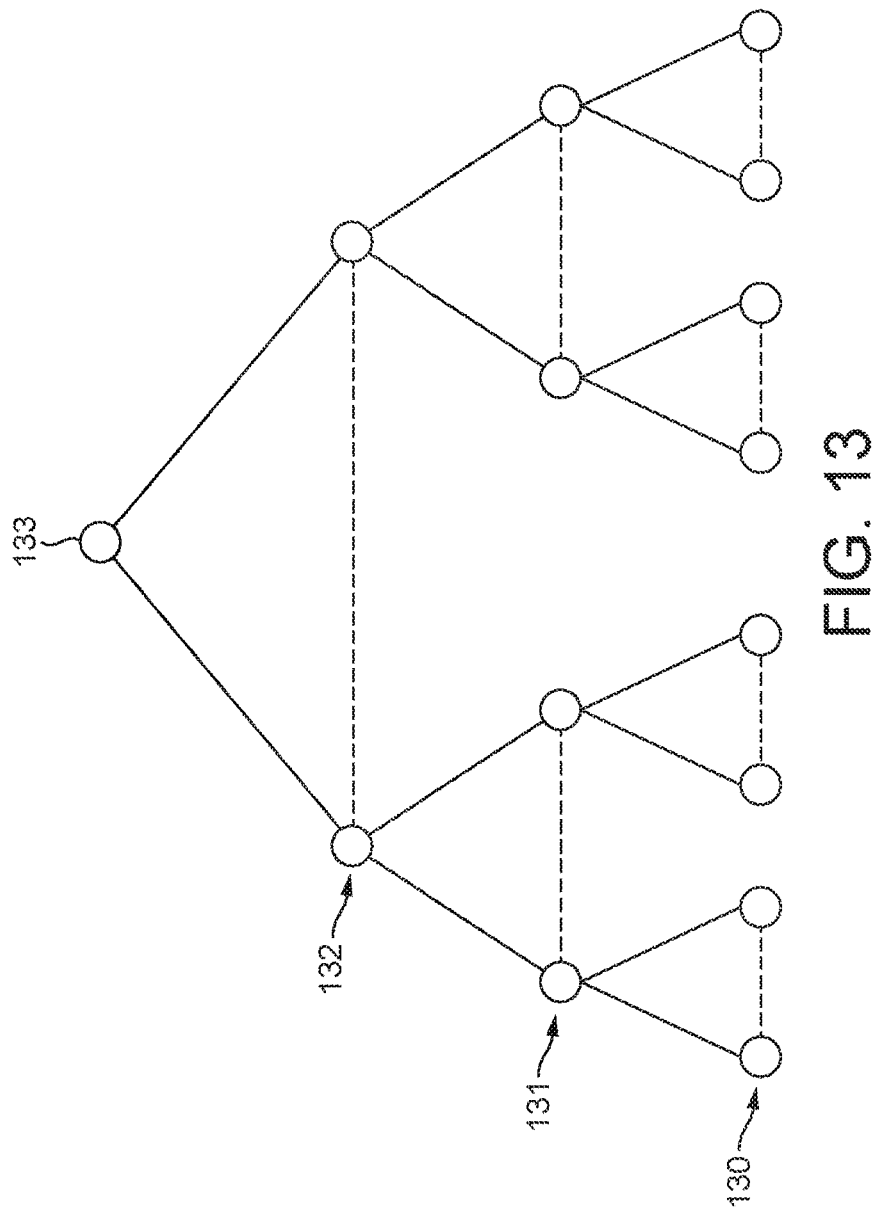
FIG. 13 shows an exemplary tree structure in an embodiment of the technology described herein.

FIG. 13 shows such an exemplary tree structure. Each leaf node 130 corresponds to a subset of primitives and has stored for it the data for that subset of primitives.

The higher level nodes 131, 132 accordingly correspond to the combination of their child nodes, and have stored for them a bounding volume that indicates the volume of space occupied by all of the subsets of primitives of their respective child nodes.

The root node 133 accordingly corresponds to the combination of all of the leaf nodes, and has stored for it a bounding volume that indicates the volume of space occupied by all of the subsets of primitives of the leaf nodes.

Other arrangements of and for the data that is stored for a subset of primitives would, of course, be possible.

Figure 14:
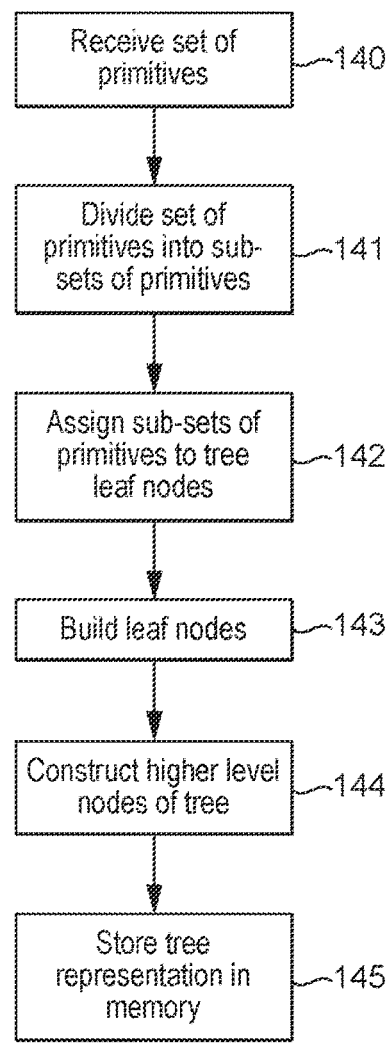
FIG. 14 shows the generation of a tree structure in an embodiment of the technology described herein.

FIG. 14 shows schematically the process for generating a tree representation for a set of primitives that is used in the present embodiments.

As shown in FIG. 14, a set of primitives to be processed, e.g. for a draw call, will be received (step 140) and divided into plural sub-sets of primitives in the manner discussed above (step 141).

Once the set of primitives has been divided into plural sub-sets of primitives, a tree representation of the set of primitives is constructed. The first stage in this process is to generate a leaf node of the tree for each respective sub-set of primitives that the set of primitives has been divided into.

To do this, each primitive sub-set is assigned to a leaf node of the tree (step 142).

The leaf nodes are then "built", by determining and storing for each leaf node of the tree, the data representative of the primitives of the sub-set of primitives that the node represents, and data indicating the volume of space that that sub-set of primitives falls within (step 143).

Once the leaf nodes that each represent a given sub-set that the set of primitives has been divided into have been determined and "constructed", the higher level nodes for the tree representation are determined and constructed (step 144). The higher level nodes are built from their respective child nodes, by "merging" their respective child nodes so that each higher level node in the tree represents the combination of the sub-sets of primitives that each of its child nodes represents.

The data that is stored for each higher level node comprises a bounding volume indicating the volume of space that all of its sub-sets of primitives falls within. This bounding volume for a higher level node may be generated, e.g., by taking the minimum and maximum vertex position values along each axis across all of the higher level node's child nodes.

Once the tree representation for the set of primitives has been generated, it is then stored in memory for use (step 145).

Once prepared, the tree representation is then used, as discussed above, to determine (identify) subsets of primitives that could cast a shadow in a (and each) tile of the frame being rendered.

To use the tree representation to determine the subsets of primitives that could cast a shadow in a tile, the nodes of the tree are traversed, building up a set of subsets of primitives that could cast a shadow. The tree is traversed from the root node, working down towards the leaf nodes (if the traversal is to continue).

During the traversal, the bounding volume for each node of the tree that is to be considered is tested against the light source bounding frustum(s) for the tile that is being rendered, to determine if any part of the bounding volume falls within the light source bounding frustum. This frustum test is performed using a suitable bounding volume-frustum intersection test.

Where necessary, the bounding volume for a node is transformed to the appropriate screen space position before it is tested against the light source bounding frustum. This may, use, e.g., a transformation matrix that provided as part of the vertex shading process.

The result of the light source bounding frustum test for a node is used to determine whether to include the sub-set of primitives for the node in the set of subsets of primitives that could cast a shadow for the tile, and to determine whether and how to continue the traversal of the tree.

The testing process starts with the root node of the tree.

If a node passes the light source bounding frustum test completely (i.e. its bounding volume is completely within the light source bounding frustum), the sub-sets of primitives for all the leaf nodes of the node are then included in (added to) the set of subsets of primitives that could cast a shadow for the tile. The traversal of the tree then continues at the parent of the accepted node (and thus moves to the next child node of that parent node still to be tested (if any)).

Correspondingly, if a node fails the light source bounding frustum test completely (i.e. its bounding volume is completely outside the light source bounding frustum), the sub-sets of primitives for all the leaf nodes of the node are not included in (added to) the set of subsets of primitives that could cast a shadow for the tile. The traversal of the tree again then continues at the parent of the rejected node (and thus moves to the next child node of the parent node of the rejected node still to be tested (if any)).

If a node that is not a leaf node partially passes the light source bounding volume frustum test (e.g. its bounding volume is only partially (but not fully) within the light source bounding frustum), then the sub-sets of primitives for the leaf nodes of the node are not included in the set of subsets of primitives that could cast a shadow for the tile at that stage, but instead the traversal of the tree is continued to the child nodes of the node in question (which are then tested themselves).

Where there is no further child node of a parent node that is still to be tested, the traversal continues at the parent node of the parent node in question (and thus moves to the next child node of the higher level parent node still to be tested (if any)) (continues with the higher level node to be tested next (if any)).

If a leaf node is found to at least partially pass the light source bounding volume frustum test (i.e. its bounding volume is at least partially within the light source bounding frustum), then the sub-set of primitives for the leaf node is included in the set of subsets of primitives that could cast a shadow for the tile. The traversal of the tree then continues at the parent of the accepted leaf node (and thus moves to the next leaf node of that parent node still to be tested (if any)).

This process is repeated until the tree has been completely traversed (until all the nodes in the tree that need to be tested, have been tested).

To generate the set of subsets of primitives, as the tree is traversed a running, master list of subsets of primitives is maintained, and as nodes pass the light source bounding frustum test, the subset(s) of primitives for each new "passing" node are added to the existing "master" list of subsets of primitives.

The output of the tree traversal is a set of subsets of primitives that could cast a shadow in the tile in question (in the form of a list of subsets of primitives indicating the subsets of primitives that could cast a shadow for the tile).

This subsets of primitives information is then provided to the graphics processing unit (GPU) 3 to indicate the subsets of primitives that could cast a shadow for the tile in question. The GPU 3 then processes (renders) the tile, using the indicated list of "shadow-casting" subsets of primitives to determine and simulate the effect of shadows in the tile in the manner discussed above with reference to FIG. 4, etc.

Figure 15:
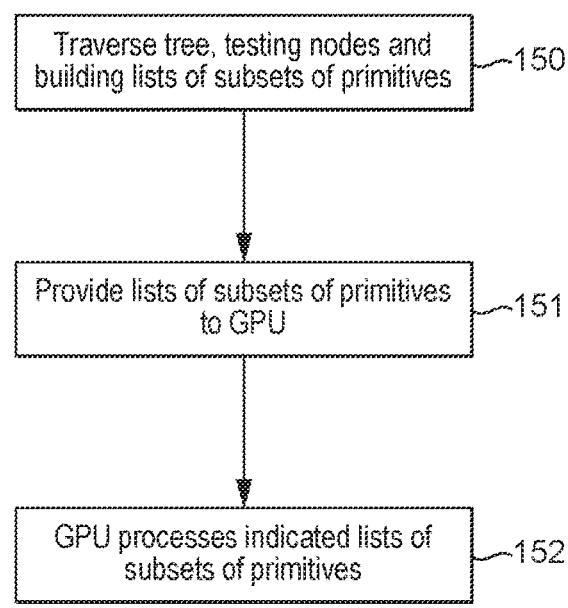
FIG. 15 shows the use of a tree structure in an embodiment of the technology described herein.

FIG. 15 is a flowchart showing the steps of the process of using the tree representation. As shown in FIG. 15, the process starts with traversing the tree, testing the nodes of the tree against the light source bounding frustum 150 and building lists of subsets of primitives using the results of those tests (step 150). The so-determined lists of subsets of primitives are then provided to the graphics processor 3 (step 151), and the graphics processor then processes the indicated lists of subsets of primitives appropriately (step 152).

When using the subsets of primitives that could cast a shadow for a tile to determine and simulate the effect of shadows in the tile, the graphics processor will use the information representative of the primitives of a subset of primitives that is stored for the subsets of primitives in question to determine the position of the primitive of the subset of primitives and thereby perform the occlusion testing against the subset of primitives in the manner discussed above, to determine the effect of a (and of each) subset of primitives that could cast a shadow on the light source visibility for each sampling position of the tile being processed.

This process is repeated for each tile to be processed for the output frame in turn, until all the tiles for the output frame have been rendered by the graphics processor 3. The process can then move on to the next output frame, and so on.

It will be appreciated from the above, that the embodiments of the technology described herein involve a number of processes that will be performed to generate the overall, final, "shadowed" output frame. For example, there will be a stage of building the subsets of primitives. Subsequently, those subsets of primitives are appropriately "culled" to determine a set of subsets of primitives that could cast a shadow for each tile of the output frame being generated. Finally, the determined set of subsets of primitives that could cast a shadow in a tile is then used when processing the tile to determine and simulate the effects of shadows in the tile. These various processes may be carried out at different points in time and in different places in the overall graphics processing system.

Figure 16:
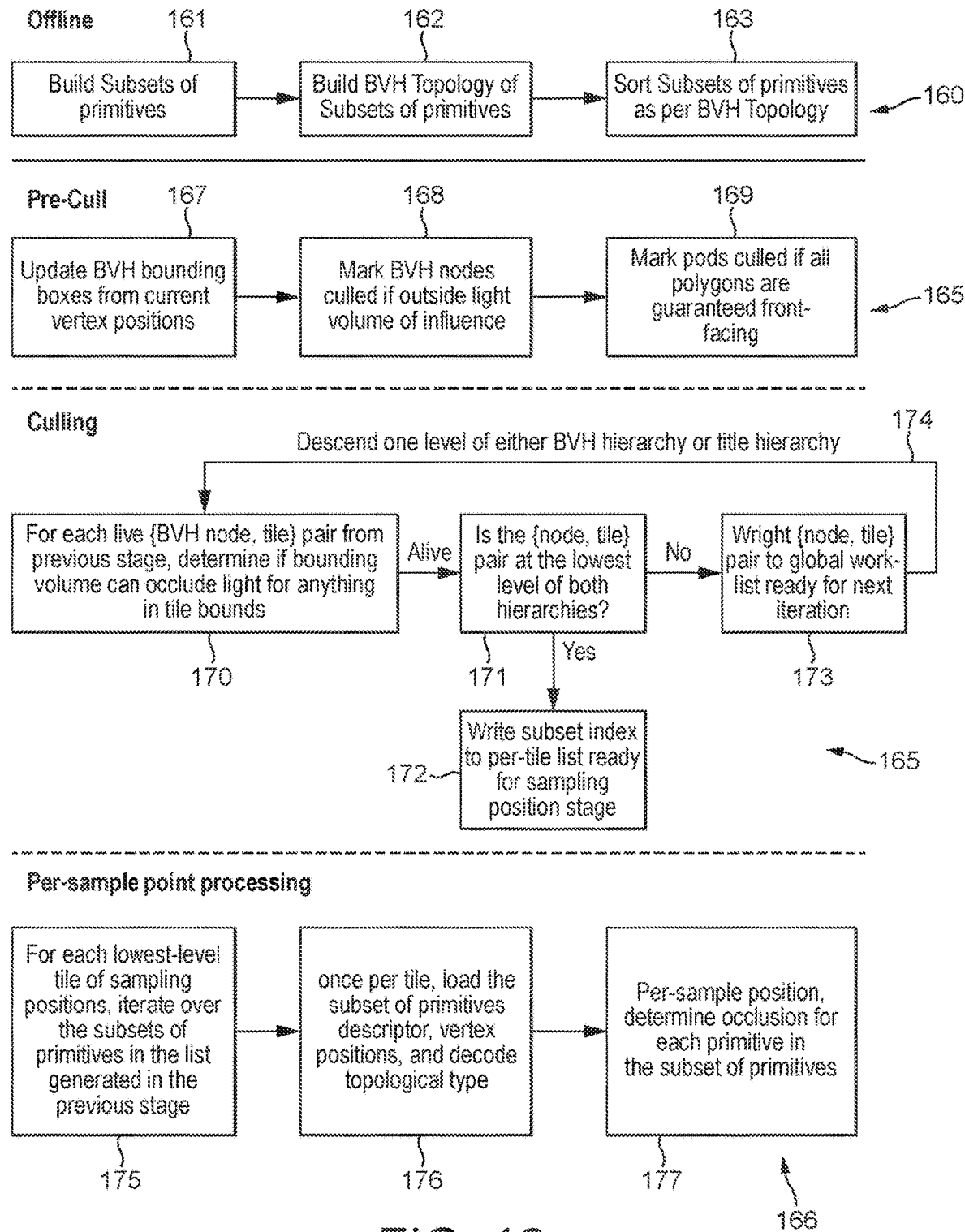
FIG. 16 shows schematically an embodiment of the operation of the graphics processing system of FIG. 1 in accordance with the technology described herein.

FIG. 16 shows schematically the various stages of the overall operation of the present embodiments.

As shown in FIG. 16, the process starts with the construction of the subsets of primitives 160. This process comprises dividing the set of primitives in question into appropriate subsets of primitives (step 161), and then building the bounding volume hierarchy (tree structure) topology of the subsets of primitives (step 162). Finally, the subsets of primitives may be sorted based on the bounding volume hierarchy (tree structure) topology (step 163). This sorting may, as discussed above, comprise, e.g., sorting the subsets of primitives into respective groups of subsets of primitives each of which will be represented by a given tree structure, such that the individual groups of subsets of primitives that are represented by a given tree structure have as small a size as possible (e.g. measured in terms of the sum of the axis extents of their bounding boxes and/or the surface areas of their bounding boxes).

As shown in FIG. 16, this process of building the subsets of primitives and the corresponding bounding volume hierarchy topology can be performed offline, in advance of the generation of the output frame in question, e.g. on a CPU (e.g. of the overall graphics processing system). It could also, e.g., be performed by the driver for the graphics processor that is to perform the graphics processing, if desired.

As shown in FIG. 16, once the subsets of primitives and their bounding volume topology (tree structures) have been constructed, that information can then be used to perform the operations discussed above when generating an output frame. As shown in FIG. 16, these operations can be divided into a pre-culling stage 164, a culling stage 165 and finally the per-sampling point processing stage 166.

These processes can all be, and are in an embodiment, performed at "run time", on the graphics processor.

As shown in FIG. 16, the pre-culling stage 164 may comprise first updating the bounding volume hierarchy (tree structure) bounding boxes for the subsets of primitives using the current vertex positions (step 167).

This may be appropriate to allow for any animation of the geometry (e.g. a character's lips, cheeks, etc. could move as they talk). In this case, it may be assumed that the topology of the vertices which form the primitives in question remains the same, but the actual vertex positions will change. At this stage therefore the bounding volumes could be updated with the new vertex position data (but with the topology for the subsets of primitives remaining the same). In this case, a "reference pose" (e.g. of the character "at rest" in a non-animated state) could be used to build the subsets of primitives initially.

It would also be possible as part of this pre-culling processing 164 to allow for any animation of the geometry in this step of updating the bounding volume hierarchy bounding boxes from the current vertex positions, if desired.

It is then determined, as discussed above, whether any of the subsets of primitives fall completely outside the light volume of influence (and any such subsets are then culled at this stage) (step 168).

As shown in FIG. 16, there may also be a step of culling subsets of primitives if it can be determined that all the primitives in the subset of primitives are guaranteed to be front-facing (step 169). This may be used to cull subsets of primitives where the shadow determination process assumes that primitives (and thus subsets of primitives) that entirely face the light will not cast shadows (i.e. that only primitives that are facing a sampling position (and thus whose back-face is "seeing the light") can cast shadows.

The facing direction of the subsets of primitives can be determined, e.g., by checking the normals for the subsets of primitives.

The result of the pre-culling stage 164 will be a reduced, overall set of subsets of primitives that can then be tested against each tile of the output frame to determine a set of subsets of primitives that could cast a shadow for each tile of the output frame.

This process is shown as the culling stage 165 in FIG. 16.

As shown in FIG. 16, this culling stage 165 comprises testing each bounding volume hierarchy (tree structure) node and tile pair to determine if the bounding volume for the node can occlude light for anything in the tile bounds (step 170).

If it is determined that the bounding volume could occlude the light for anything in the tile bounds, it is then determined if the subset bounding volume hierarchy node and the tile pair are at the lowest level of both hierarchies (step 171). If so, the primitive subset in question (i.e. represented by the bounding volume hierarchy node in question) is added to the per-tile list of subsets of primitives ready for the per-sampling position stage (step 172).

On the other hand, if the lowest level of both hierarchies has not yet been reached, the node and tile pair is added to a global work list ready for the next iteration (step 173), and the process then descends 174 one level of either the bounding volume hierarchy (tree structure node hierarchy) or the output frame tile hierarchy, to perform the test at the next lower level of the hierarchy.

This is continued until all of the subsets of primitives have been appropriately tested against the tile in question (and is then repeated for each tile of the output frame to be processed).

The output of the culling stage 165 will be respective lists of subsets of primitives that could cast a shadow for each tile of the output frame.

The tiles are then processed in the per-sampling point processing stage 166 to determine the occlusion (the visibility parameter) for each sampling position in the tile.

As discussed above, and as shown in FIG. 16, this comprises, inter alia, for each lowest level tile of sampling positions iterating over the subsets of primitives in the list generated in the culling stage (step 175), and once per tile, loading the appropriate subset of primitives descriptor and vertex positions for each subset of primitives to be considered for the tile and decoding the vertex positions and topological type for the subset of primitives (step 176), and then using that information to determine the per-sample position occlusion for each primitive in the subset of primitives (step 177).

This is repeated for each subset of primitives listed as potentially casting a shadow in the tile in question (and is correspondingly repeated for each tile of the output frame to be generated).

Various modifications, additions, and alternatives to the above-described embodiments of the technology described herein would be possible, if desired.

For example, although the present embodiment has been described above with reference to testing "light source bounding frustums" to determine subsets of primitives that could cast a shadow in a given frame region (tile), it would alternatively be possible to test for this by trying to find a "splitting plane", where the light and the region to be lit are on one side of the plane and the potentially occluding subset of primitives is on the other.

So far as the light source visibility parameters are concerned, this process could be adapted to take account of transparent primitives. For example, when a rasterisation process to compute visibility for the sample points is performed, the resulting set of bits could be modulated by a random set of bits whose ratio of set bits is proportional to the transparency (or opacity) of the primitive (geometry) in question. Alternatively, if the sample points themselves are suitably randomised, they could be modulated by a simple fixed bit-string with an appropriate ratio of set bits. It would also be possible to extend this to provide fully coloured RGB transparency, by having one bit each for each colour channel R, G, B (for each visibility sample).

The above embodiments consider the geometry in world-space (perform the bounding volume tests in world space). Depending upon the graphics processing hardware that is available and the results that are required, it would also be possible to perform the computations in screen space, if desired (and in an embodiment this is what is done).

Also, although the above embodiment has been described in the context of a tiled deferred renderer, this is not essential, and the present embodiments (and the technology described herein) can be used with and for other forms of renderer. Thus, for example, the present embodiments and the technology described herein could be used with other tiled methods, such as "tiled forward rendering" (also known as "forward plus"), and also with non-tiled renderers. With a non-tiled renderer, a tiled approach could be used to render the light source visibility parameters into respective screen space visibility buffers, with the final rendering (shading) then being performed in a separate pass.

Also, although the present embodiments have been described with reference to the use of the present embodiments for an area light, it would also be possible to use the techniques of the present embodiments for point ("punctual") lights, if desired. In this case, for example, a single light source sampling position for the point light could be used.

Also, although the present embodiments have been described above with reference to the determination of geometry that could cast shadows in a frame region, the techniques of the technology described herein could be used for other purposes as well, for example in situations where it is desired and possible to test contiguous subsets of primitives as a whole.

It can be seen from the above that the technology described herein, in its embodiments at least, provides a method and apparatus that can subdivide a set of primitives to be processed into a set of subsets of primitives that can then be used in an efficient manner to test the subsets of primitives for a desired purpose, such as, and in an embodiment, for determining subsets of primitives that could cast a shadow from a light source in a region of an output frame.

This is achieved in the embodiments of the technology described herein at least by dividing a set of primitives to be processed into subsets of primitives such that each subset of primitives only contains to a maximum number of contiguous primitives, and then storing for each subset of primitives data representing the primitives of the subsets of primitives and data representing the volume of space that the subset of primitives occupies.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of processing a set of plural primitives to be processed for a frame for output in a graphics processing system, each primitive in the set of primitives being associated with one or more vertices, the method comprising:
dividing the set of primitives into plural subsets of primitives, such that each primitive is allocated into one subset of primitives only, and each subset of primitives contains only contiguous primitives by:
taking an unallocated primitive of the set of primitives as a starting primitive for a subset of primitives;
determining if that starting primitive for the subset of primitives has any contiguous primitives that are not yet allocated to a subset of primitives; and
when it is determined that the starting primitive has a contiguous primitive that is not already allocated to a subset of primitives:
adding that primitive to the subset of primitives in the case that the starting primitive has only one contiguous primitive that is not already allocated to a subset of primitives; and
in the case that the starting primitive has more than one contiguous primitives that are not already allocated to a subset of primitives, selecting one of the contiguous primitives to add to the subset of primitives by comparing the normal directions of the contiguous primitives with a normal direction of the starting primitive and selecting a contiguous primitive of the contiguous primitives whose normal direction deviates the least from the normal direction of the starting primitive using the comparison, and adding the selected primitive to the subset of primitives; and
determining if there are any other primitives that are not yet allocated to a subset of primitives that are contiguous with at least one of the primitives of the current subset of primitives; and
when it is determined that there is another primitive that is not yet allocated to a subset of primitives that is contiguous with at least one of the primitives of the current subset of primitives:
adding that primitive to the subset of primitives in the case that there is only one other primitive that is not yet allocated to a subset of primitives that is contiguous with at least one of the primitives of the current subset of primitives; and
in the case that there are more than one other primitives that are not yet allocated to a subset of primitives that are contiguous with at least one of the primitives of the current subset of primitives, selecting one of the contiguous primitives to add to the subset of primitives by comparing the normal directions of the contiguous primitives with a normal direction of a primitive or primitives of the current subset of primitives and selecting a contiguous primitive of the contiguous primitives whose normal direction deviates the least from the normal direction of the primitive or primitives of the current subset of primitives using the comparison, and adding the selected primitive to the subset of primitives; and
continuing to determine if there are any other primitives that are not yet allocated to a subset of primitives that are contiguous with at least one of the primitives of the current subset of primitives; and, if so, adding a primitive to the current subset of primitives;
until a condition for finishing the current subset of primitives and starting a new subset of primitives is reached;
the method further comprising:
generating and storing for each subset of primitives that the set of primitives has been divided into, data representative of the primitives of the subset of primitives, and data indicating the volume of space that the subset of primitives falls within.

2. The method of claim 1, wherein:
each subset of primitives is allowed to contain no more than a particular maximum number of vertices.

3. The method of claim 1, wherein:
the data representative of the primitives of a subset of primitives comprises data indicating a set of vertex positions for the subset of primitives and additional topology data that, together with the vertex positions, can be used to determine the topology of the primitives in the subset of primitives.

4. The method of claim 1, comprising, when two primitives of a subset of primitives are coplanar and share an edge, merging the two primitives of the subset of primitives into a single primitive for the purpose of the subset of primitives.

5. The method of claim 1, comprising storing the data for the subsets of primitives as one or more tree representations representing the set of primitives, with each leaf node of a tree representation representing one of the subsets of primitives that the set of primitives has been divided into, and having stored for it, the data for the subset of primitives that it represents.

6. The method of claim 1, further comprising:
using the generated and stored data to determine one or more subsets of primitives to be processed when processing the set of primitives for the output frame; and
processing the determined one or more subsets of primitives when processing the set of primitives for the output frame.

7. The method of claim 6, further comprising:
discarding any subset of primitives for which all the primitives of the subset of primitives face in the same direction when using the generated and stored data to determine the one or more subsets of primitives to be processed when processing the set of primitives for the output frame.

8. The method of claim 1, further comprising, when rendering a frame for output that includes a light source that could cast shadows, for at least one region of the frame being rendered:
using the generated and stored data to:
determine a set of the subsets of primitives to be processed for the frame that could cast a shadow from a light source to be considered for the frame for the region of the frame being rendered; and to:
for each sampling position of a set of sampling positions for the region of the frame being rendered, determine a light source visibility parameter using the determined set of subsets of primitives.

9. The method of claim 1, wherein selecting a contiguous primitive of the contiguous primitives whose normal direction deviates the least comprises:

in the case that there is only one contiguous primitive whose normal direction deviates the least, selecting that primitive; and in the case that there are more than one contiguous primitives whose normal directions deviate the least, selecting the contiguous primitive that will increase the size of the subset of primitives by the least amount.

10. An apparatus for processing a set of plural primitives to be processed for a frame for output in a graphics processing system, each primitive in the set of primitives being associated with one or more vertices, the apparatus comprising processing circuitry configured to:

divide a set of primitives to be processed for a frame for output in a graphics processing system into plural subsets of primitives, such that each primitive is allocated into one subset of primitives only, and each subset of primitives contains only contiguous primitives by:

taking an unallocated primitive of the set of primitives as a starting primitive for a subset of primitives;

determining if that starting primitive for the subset of primitives has any contiguous primitives that are not yet allocated to a subset of primitives; and when it is determined that the starting primitive has a contiguous primitive that is not already allocated to a subset of primitives:

adding that primitive to the subset of primitives in the case that the starting primitive has only one contiguous primitive that is not already allocated to a subset of primitives; and in the case that the starting primitive has more than one contiguous primitives that are not already allocated to a subset of primitives, selecting one of the contiguous primitives to add to the subset of primitives by comparing, the normal directions of the contiguous primitives with a normal direction of the starting primitive and selecting a contiguous primitive of the contiguous primitives whose normal direction deviates the least from the normal direction of the starting primitive using the comparison, and adding the selected primitive to the subset of primitives; and determining if there are any other primitives that are not yet allocated to a subset of primitives that are contiguous with at least one of the primitives of the current subset of primitives; and when it is determined that there is another primitive that is not yet allocated to a subset of primitives that is contiguous with at least one of the primitives of the current subset of primitives:

adding that primitive to the subset of primitives in the case that there is only one other primitive that is not yet allocated to a subset of primitives that is contiguous with at least one of the primitives of the current subset of primitives; and in the case that there are more than one other primitives that are not yet allocated to a subset of primitives that are contiguous with at least one of the primitives of the current subset of primitives, selecting one of the contiguous primitives to add to the subset of primitives by comparing the normal directions of the contiguous primitives with a normal direction of a primitive or primitives of the current subset of primitives and selecting a contiguous primitive of the contiguous primitives whose normal direction deviates the least from the normal direction of the primitive or primitives of the current subset of primitives using the comparison, and adding the selected primitive to the subset of primitives; and continuing to determine if there are any other primitives that are not yet allocated to a subset of primitives that are contiguous with at least one of the primitives of the current subset of primitives; and, if so, adding a primitive to the current subset of primitives;

until a condition for finishing the current subset of primitives and starting a new subset of primitives is reached;

and the processing circuitry is configured to:

generate and store for each subset of primitives that the set of primitives has been divided into, data representative of the primitives of the subset of primitives, and data indicating the volume of space that the subset of primitives falls within.

11. The apparatus of claim 10, wherein:
each subset of primitives is allowed to contain no more than a particular maximum number of vertices.

12. The apparatus of claim 10, wherein:
the data representative of the primitives of a subset of primitives comprises data indicating a set of vertex positions for the subset of primitives and additional topology data that, together with the vertex positions, can be used to determine the topology of the primitives in the subset of primitives.

13. The apparatus of claim 10, wherein the processing circuitry is configured to:
when two primitives of a subset of primitives are coplanar and share an edge, merge the two primitives of the subset of primitives into a single primitive for the purpose of the subset of primitives.

14. The apparatus of claim 10, wherein the processing circuitry is configured to:
store the data for the subsets of primitives as one or more tree representations representing the set of primitives, with each leaf node of a tree representation representing one of the subsets of primitives that the set of primitives has been divided into, and having stored for it, the data for the subset of primitives that it represents.

15. The apparatus of claim 10, wherein the processing circuitry is configured to:
use the generated and stored data to determine one or more subsets of primitives to be processed when processing the set of primitives for the output frame; and
process the determined one or more subsets of primitives when processing the set of primitives for the output frame.

16. The apparatus of claim 15, wherein the processing circuitry is configured to:
discard any subset of primitives for which all the primitives of the subset of primitives face in the same direction when using the generated and stored data to determine the one or more subsets of primitives to be processed when processing the set of primitives for the output frame.

17. The apparatus of claim 10, wherein the processing circuitry is configured to:
when rendering a frame for output that includes a light source that could cast shadows, for at least one region of the frame being rendered:
use the generated and stored data to:
determine a set of the subsets of primitives to be processed for the frame that could cast a shadow from a light source to be considered for the frame for the region of the frame being rendered; and to:

for each sampling position of a set of sampling positions for the region of the frame being rendered, determine a light source visibility parameter using the determined set of subsets of primitives.

18. The apparatus of claim 10, wherein the processing circuitry is configured to select a contiguous primitive whose normal direction deviates the least by:

in the case that there is only one contiguous primitive whose normal direction deviates the least, selecting that primitive; and in the case that there are more than one contiguous primitives whose normal directions deviate the least, selecting the contiguous primitive that will increase the size of the subset of primitives by the least amount.

19. A non-transitory computer readable storage medium storing computer software code which when executing on a processor performs a method of processing a set of plural primitives to be processed for a frame for output in a graphics processing system, each primitive in the set of primitives being associated with one or more vertices, the method comprising:

dividing the set of primitives into plural subsets of primitives, such that each primitive is allocated into one subset of primitives only, and each subset of primitives contains only contiguous primitives by:

taking an unallocated primitive of the set of primitives as a starting primitive for a subset of primitives;

determining if that starting primitive for the subset of primitives has any contiguous primitives that are not yet allocated to a subset of primitives; and when it is determined that the starting primitive has a contiguous primitive that is not already allocated to a subset of primitives:

adding that primitive to the subset of primitives in the case that the starting primitive has only one contiguous primitive that is not already allocated to a subset of primitives; and in the case that the starting primitive has more than one continuous primitives that are not already allocated to a subset of primitives, selecting one of the contiguous primitives to add to the subset of primitives by comparing the normal directions of the continuous primitives with a normal direction of the starting primitive and selecting a contiguous primitive of the contiguous primitives whose normal direction deviates the least from the normal direction of the starting primitive using the comparison, and adding the selected primitive to the subset of primitives; and determining if there are any other primitives that are not yet allocated to a subset of primitives that are contiguous with at least one of the primitives of the current subset of primitives; and when it is determined that there is another primitive that is not yet allocated to a subset of primitives that is contiguous with at least one of the primitives of the current subset of primitives:

adding that primitive to the subset of primitives in the case that there is only one other primitive that is not yet allocated to a subset of primitives that is contiguous with at least one of the primitives of the current subset of primitives; and in the case that there are more than one other primitives that are not yet allocated to a subset of primitives that are contiguous with at least one of the primitives of the current subset of primitives, selecting one of the contiguous primitives to add to the subset of primitives by comparing the normal directions of the contiguous primitives with a normal direction of a primitive or primitives of the current subset of primitives and selecting a contiguous primitive of the contiguous primitives whose normal direction deviates the least from the normal direction of the primitive or primitives of the current subset of primitives using the comparison, and adding the selected primitive to the subset of primitives; and continuing to determine if there are any other primitives that are not yet allocated to a subset of primitives that are contiguous with at least one of the primitives of the current subset of primitives; and, if so, adding a primitive to the current subset of primitives:

until a condition for finishing the current subset of primitives and starting a new subset of primitives is reached;

the method further comprising:

generating and storing for each subset of primitives that the set of primitives has been divided into, data representative of the primitives of the subset of primitives, and data indicating the volume of space that the subset of primitives falls within.

* * * * *